(12) United States Patent
Calley

(10) Patent No.: US 12,119,708 B2
(45) Date of Patent: Oct. 15, 2024

(54) ELECTRICAL MACHINE HAVING SHAPED SOFT METAL COMPOSITE COMPONENTS WITH AXIAL AND RADIAL AIRGAPS

(71) Applicant: David Calley, Flagstaff, AZ (US)

(72) Inventor: David Calley, Flagstaff, AZ (US)

(73) Assignee: Elemental Motors, LLC, Flagstaff, AZ (US)

( * ) Notice: Subject to any disclaimer, the term of this patent is extended or adjusted under 35 U.S.C. 154(b) by 0 days.

(21) Appl. No.: 17/790,722

(22) PCT Filed: Mar. 18, 2021

(86) PCT No.: PCT/US2021/022889
§ 371 (c)(1),
(2) Date: Jul. 1, 2022

(87) PCT Pub. No.: WO2021/188758
PCT Pub. Date: Sep. 23, 2021

(65) Prior Publication Data
US 2023/0069099 A1  Mar. 2, 2023

Related U.S. Application Data

(60) Provisional application No. 63/100,541, filed on Mar. 18, 2020.

(51) Int. Cl.
H02K 1/02 (2006.01)
H02K 1/14 (2006.01)
(Continued)

(52) U.S. Cl.
CPC ............ *H02K 1/148* (2013.01); *H02K 1/02* (2013.01); *H02K 1/145* (2013.01); *H02K 1/16* (2013.01);
(Continued)

(58) Field of Classification Search
CPC ............ H02K 1/02; H02K 1/14; H02K 1/145; H02K 1/146; H02K 1/18; H02K 1/182;
(Continued)

(56) References Cited

U.S. PATENT DOCUMENTS 6,946,771 B2 * 9/2005 Cros .................... H02K 21/16
310/263
9,559,558 B2    1/2017 Nadeau et al.
(Continued)

FOREIGN PATENT DOCUMENTS

DE    102006036707 B3 *  2/2008  ............. H02K 21/24
GB       2544712 A    *  5/2017  ............. H02K 1/145
(Continued)

OTHER PUBLICATIONS

Marquardt, Machine Translation of DE102006036707, Feb. 2008 (Year: 2008).*
Search Report, GB2108502.2, Mar. 2, 2022, Patent Act 1977: Search Report under Section 17(5), Great Britain Intellectual Property Office.

*Primary Examiner* — Eric Johnson
(74) *Attorney, Agent, or Firm* — Invention To Patent Services; Alex Hobson

(57) ABSTRACT

An electric machine, which may operate as an electric motor or generator, that address performance and manufacturing shortcomings in various motor design approaches particularly transverse flux, axial and radial flux motors with higher torque, higher RPM, and lower core losses and lower cogging. An exemplary electric machine incorporates shape monolithic components such as the armature teeth or connector ring, armature ring, concentrator teeth or concentrator ring formed by Soft metal Composite (SMC). Magnets may be configured between the concentrator teeth to form a magnet ring having a plurality of magnetic poles. The armature flux paths may be shared between phases. The air
(Continued)

gaps may be axial and extend between armature teeth and concentrator teeth and the magnetic poles configured between the concentrator teeth. The armature, concentrator teeth and magnetic poles may extend radially and alternate along the axial axis of the electric machine, producing axial and/or radial airgaps.

40 Claims, 25 Drawing Sheets

(51) Int. Cl.
    *H02K 1/16*         (2006.01)
    *H02K 1/20*         (2006.01)
    *H02K 3/46*         (2006.01)
    *H02K 21/24*       (2006.01)

(52) U.S. Cl.
    CPC .............. *H02K 3/46* (2013.01); *H02K 21/24* (2013.01); *H02K 1/20* (2013.01); *H02K 2201/12* (2013.01)

(58) Field of Classification Search
    CPC .......... H02K 1/48; H02K 16/02; H02K 16/04; H02K 21/24; H02K 2201/12; H02K 1/141; H02K 1/143; H02K 1/148; H02K 1/2798; H02K 3/524; H02K 3/525; H02K 21/145; H02K 21/18
    See application file for complete search history.

(56) References Cited

U.S. PATENT DOCUMENTS

| | | | |
|---|---|---|---|
| 2005/0029890 A1* | 2/2005 | Kadoya | H02K 21/48 310/180 |
| 2005/0116575 A1 | 6/2005 | Zepp et al. | |
| 2006/0028087 A1* | 2/2006 | Lonel | H02K 1/148 310/216.086 |
| 2008/0001492 A1 | 1/2008 | Cros et al. | |
| 2009/0322165 A1* | 12/2009 | Rittenhouse | H02K 21/125 318/400.26 |
| 2011/0169366 A1* | 7/2011 | Calley | H02K 29/03 310/216.112 |
| 2012/0080965 A1* | 4/2012 | Bradfield | H02K 1/20 310/58 |
| 2013/0214631 A1 | 8/2013 | Smith et al. | |
| 2013/0264905 A1* | 10/2013 | Calley | H02K 3/18 29/596 |
| 2015/0180289 A1* | 6/2015 | Washington | H02K 1/145 310/44 |
| 2015/0340912 A1* | 11/2015 | Calley | H02K 1/145 310/216.003 |
| 2016/0043602 A1* | 2/2016 | Hosek | H02K 1/02 310/179 |
| 2017/0338705 A1* | 11/2017 | Klassen | H02K 9/00 |
| 2019/0252928 A1 | 8/2019 | Calley | |

FOREIGN PATENT DOCUMENTS

| | | | | |
|---|---|---|---|---|
| WO | WO-2008068503 A2 * | 6/2008 | ............... | H02K 1/14 |
| WO | WO-2011076579 A1 * | 6/2011 | ............. | H02K 1/145 |

\* cited by examiner

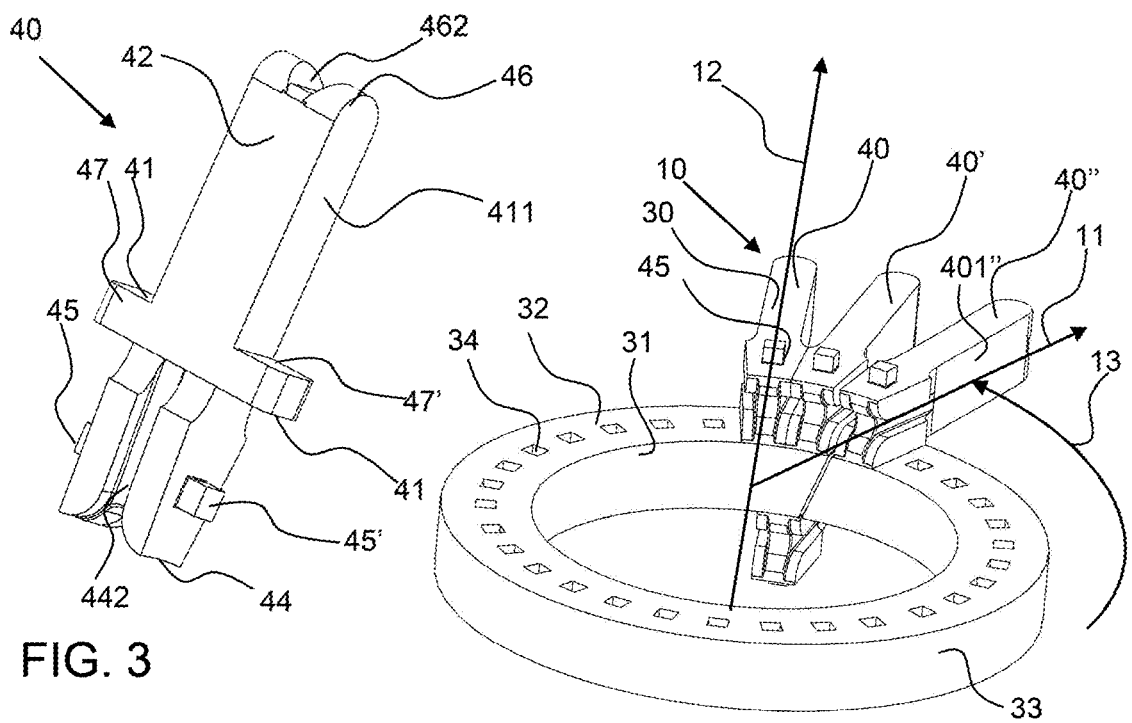
FIG. 3
FIG. 4
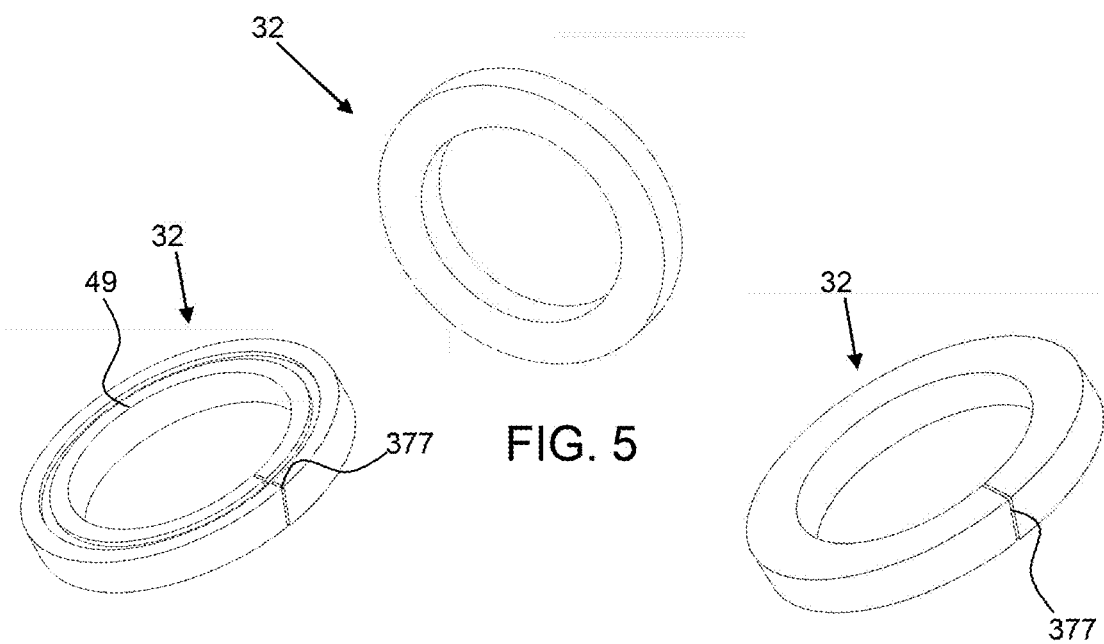
FIG. 7
FIG. 5
FIG. 6

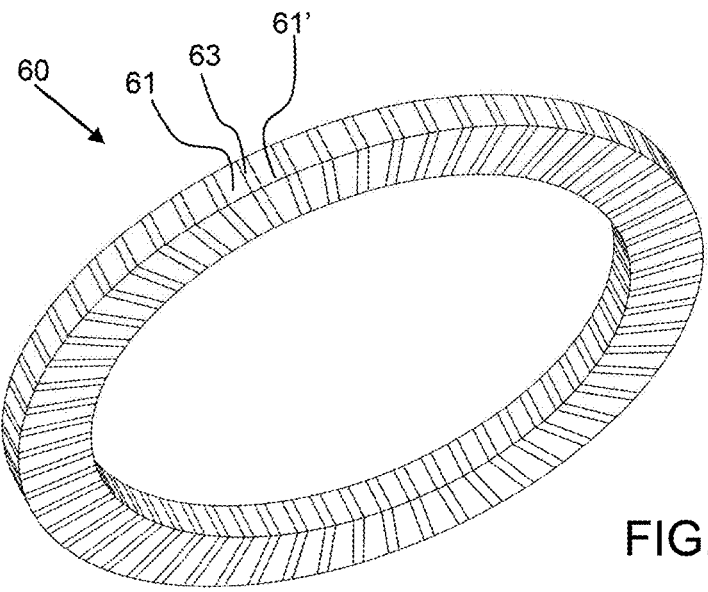
FIG. 22
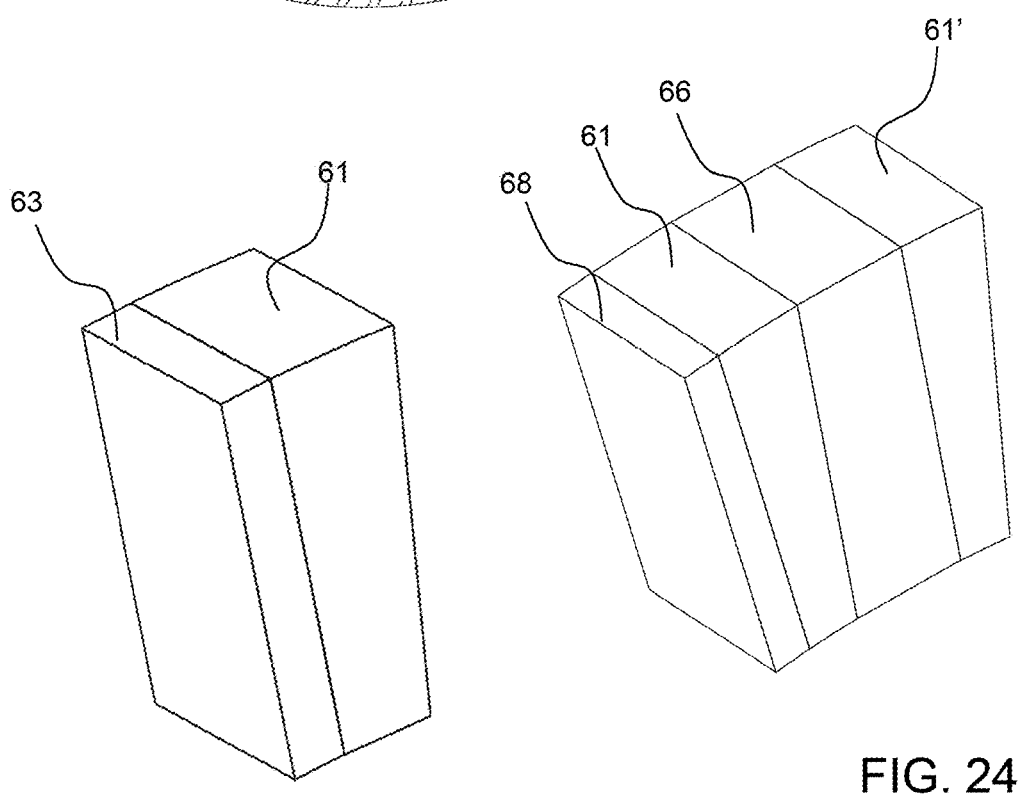
FIG. 23
FIG. 24

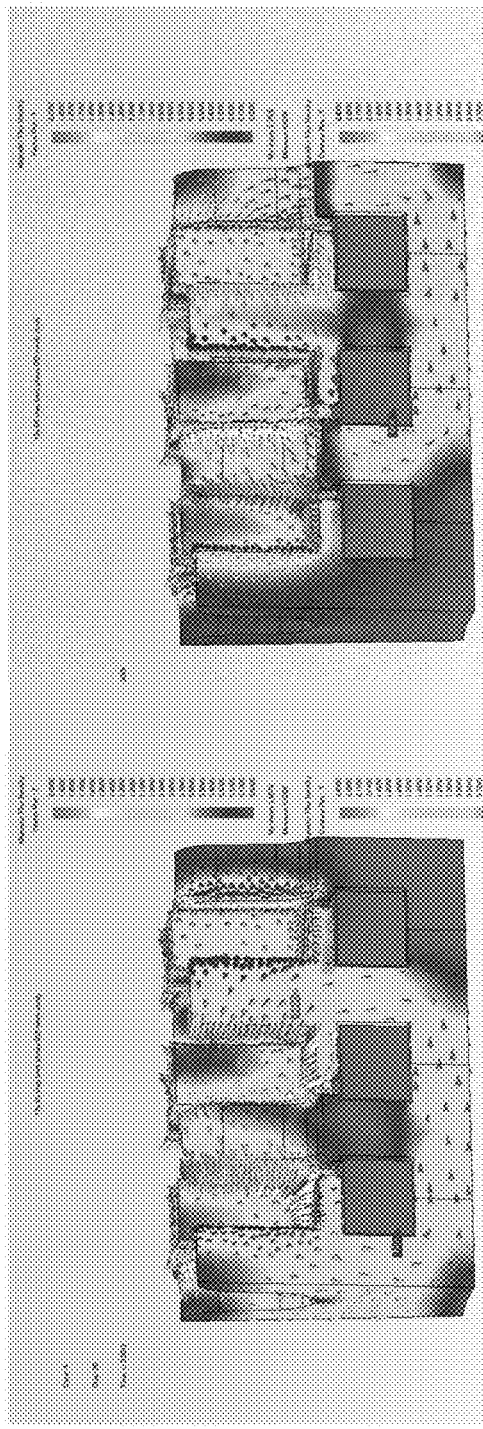
FIG. 29
FIG. 31
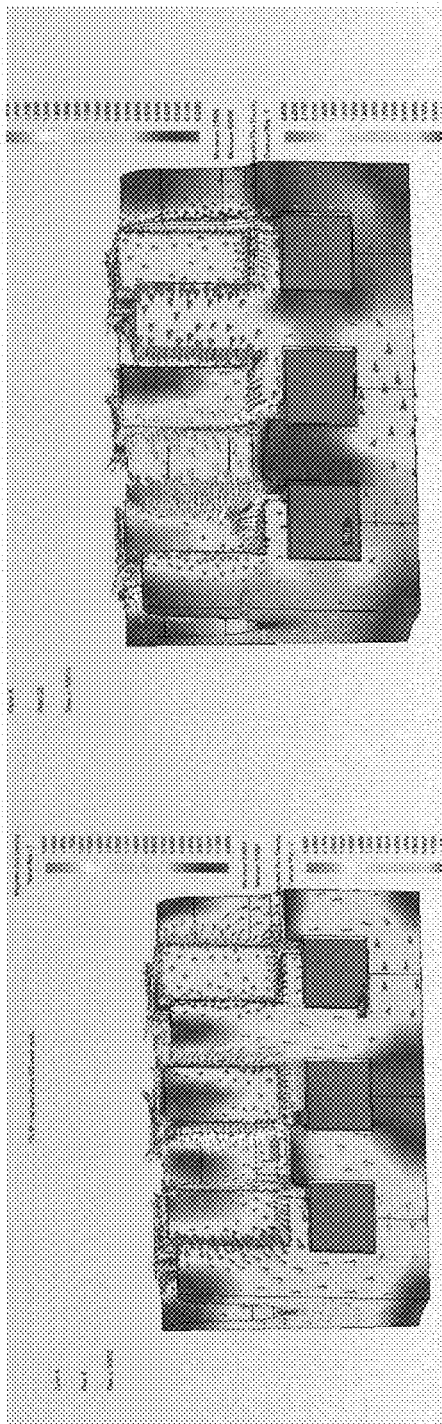
FIG. 30
FIG. 32

ELECTRICAL MACHINE HAVING SHAPED SOFT METAL COMPOSITE COMPONENTS WITH AXIAL AND RADIAL AIRGAPS

CROSS REFERENCE TO RELATED APPLICATIONS

This application claims the benefit of priority to U.S. provisional patent application No. 63/100,541, filed on Mar. 18, 2020; the entirety of which is hereby incorporate by reference herein.

BACKGROUND OF THE INVENTION

Field of the Invention

The invention relates to relates to transverse flux electric machines, which may operate as electric motor and generator, that have axial and/or radial air gaps that may include shaped components made from soft metal composites, such as armatures and/or concentrators.

Background

There is a need for electric machines and particularly electric motors that can operate at high torque over a wide range of revolutions per minute (RPM) and maintain a high efficiency and are economical to produce. Transvers flux electric motors provide high efficiency and high torque output at relatively low revolutions per minute and are well suited for direct drive industrial and commercial applications such as electric bikes and low speed vehicles.

Electric motors used in automotive traction applications may produce excessive core loss drag when a low torque output is required and the vehicle is traveling at a relatively high rate of speed, such as when traveling downhill and little or no torque is required from the electric motor.

Soft metal Composite (SMC), has been used to make components of electric machines, such as the armatures and or armature teeth but have had limited use due to the complexity of manufacturing, especially when more intricate shapes are required, relatively high core losses, and increases in torque have been modest. These have been marketed but are relatively rare with only modest performance gains.

(In addition, SMC components have a high cost of development, tooling and production, therefore, SMC components have had limited commercial success.—This sentence seems redundant with the last sentence)

Engineering transverse flux motors is more expensive due, in part, to the fact that designs are three-dimensional and therefor are both computationally more intensive and also because they have more design variables that need to be engineered than conventional motors. The production cost per mass of Transverse Flux Motors (TFM) is hypothetically quite similar to conventional machines and should scale with the mass of the same constituent materials however production cost is generally also higher, due primarily to a lack of many decades of improvements in design and manufacturing and significantly due to three-dimensional flux paths limiting appropriate constructions.

In previously described electric machines incorporating slit metal armatures, separate toroidal return parts were required to complete the flux path. Although conceptually simple, substantial work is required to manufacture the toroid return part. Each part is wound, then may be ground to dimension, if necessary, cut across the circumference to prevent high circulating currents, encapsulate with outer non-conductive band, and machined to provide features to align them to the armatures, such as pins. These all take time and is costly. Similarly, the armatures are wound, annealed, notched, encapsulated, ground, if necessary, and machined with mating features to precisely align them to toroidal returns and/or case. The resulting machines limited practical markets.

Armatures have been shown formed of slit metal that share flux with an adjoining phase or phases. Advantages were gained but many were not possible due to the material forming limitations and also since then, many critical improvements are disclosed.

These issues have also limited the investment and development in the field. For example, work has not been done to operate motors at high-power levels typical of high performance and high-volume motors such those required for automotive traction applications. This has relegated the motors to small niche and generally low RPM and low power applications.

SUMMARY OF THE INVENTION

The invention is directed to electric machines, which may operate as an electric motor or generator, that address performance and manufacturing shortcomings in various motor design approaches particularly transverse flux, axial and radial flux motors with higher torque, higher RPM, lower core losses and lower cogging.

An exemplary electric machine has an arrangements of armatures rings and magnet rings configured to produce axial airgaps and/or radial airgaps depending on the application requirement. The armature teeth, or armatures, may be coupled to an armature connector ring which may be a monolithic component or part (one piece part) formed by Soft metal Composite (SMC). The armatures may comprise armature teeth that extend from an armature connector ring of the armature ring and the concentrators may comprise concentrator teeth that may be an integral part of a concentrator connector ring. Magnets may be configured between the concentrator teeth to form a magnet ring having a plurality of magnetic poles. Again, the concentrator ring, including the concentrator connector ring and the plurality of concentrator teeth, extending therefrom, may be a monolithic component (one piece part) formed by Soft metal Composite (SMC). A monolithic component, as used herein, is a one piece part that may be formed from a single material in a mold such as through compression of powdered metal in a SMC part or through molding or casting, such as may be used for the magnet ring retainer. In an exemplary embodiment, the armature flux paths are shared between phases. The air gaps may be axial and extend between armature teeth and concentrator teeth. The concentrators form the poles. The magnets provide the flux and are also part of the flux path forming a "magnet ring". The armature and concentrator teeth and magnetic poles may extend radially and alternate around the axis of the electric machine. An exemplary electric machine may have axial and/or radial air gaps. The airgaps may be configured very near the OD of the motor/generator, or proximal an outside surface of the armature ring, thereby providing a higher average diameter and therefor torque.

An exemplary electric machine includes components that are monolithic and formed from soft metal composite, such as the armature teeth, the armature concentrator ring, the at mature ring that includes both the armature teeth and at mature connector ring, and a flux return portion, a toroidal return as used herein, that completes the path around the coils, as a single part. A number of features are provided in the monolithic shaped components making assembly, costs and performance improved.

Armature teeth may be monolithic components formed from soft metal composite and may have a number of features built into the shaped component. An exemplary armature tooth may be tapered from a connected end to an extended end and may taper up to an axial airgap surface, whereby the cross-sectional area of the armature tooth increases away from the axial airgap surface to improve structural strength, reduce core losses and increase permeability. An armature tooth may taper in a tip portion from where it is connected with the armature connector ring to an extended end, or over the airgap portion, the portion of the armature tooth that overlaps the magnet ring to produce an airgap. An armature tooth may also have an anti-cogging feature built into the airgap surfaces, such as an axial and/or radial airgap surface. An exemplary anti-togging feature may be a depression in the airgap surface which may be configured in one or more of the armature teeth. An armature tooth may have a radial gap extension(s) that form radial airgaps with a magnetic ring. An exemplary armature tooth may have both axial and radial airgap surfaces.

An exemplary monolithic armature tooth, may include armature connector ring coupling portions, such a protrusions, that are configured to locate and couple the tooth to an armature tooth coupling portion, such as a recess or aperture, of an armature connector ring. The teeth may be coupled around the armature connector ring in a circumferential array to form an armature ring. The armature teeth may have flow channel features that are configured to receive potting to better process in molding and produce a more mechanically stable and rigid armature ring. The flow channels may extend radially and circumferentially on the extended end and along a connected end of the armature teeth.

An armature connector ring may have features configured in the monolithic shaped component including a coil slot that is configured to receive a coil or a portion of the coil. Two adjacent and stacked armature rings may form a coil channel from the alignment of their respective coil slots. A wire slot may be shaped into the armature connector ring as well, to provide a path for the coil wires. A current slot may be configured in an armature connector ring to prevent current from flowing circumferentially around the armature connector ring. The slot may extend all the way through the armature connector ring, radially from an inside diameter to an outside diameter or the armature connector ring. An armature connector ring may have a cooling channel shaped therein, which may extend circumferentially around at least a portion of the armature ring. A cooling channel inlet and outlet may be configured in the armature connector ring to allow a flow of cooling fluid through the cooling channel. The cooling channel may be radially inward or outward from the toroidal return.

An exemplary SMC armature may be impregnated to prevent leakage of cooling fluid flowing through a cooling channel configured therein. An exemplary armature connector ring may also have a toroidal return configured therein. The toroidal return may extend axially out from the armature connector ring and couple with a toroidal return or extension of an adjacent armature ring. An armature connector ring may also have toroidal return locating features to position and couple a separate toroidal return with the armature connector ring. An exemplary toroidal return locating feature may be a recess, or keyway and the toroidal return may have protrusions or keys for insertion therein, or vice versa.

An armature ring may also have a torque key that extends radially inward or outward to enable a mechanical connection with a shaft. All of the above described features may be configured in a single shaped monolithic armature connector ring. The armature teeth may also be an integral part of the monolithic armature ring, thereby making assembly more precise, much quicker and less costly. Also, the alignment of components is much easier as the geometry of the teeth and poles are built into the shaped components.

An exemplary concentrator connector ring may be a monolithic component made from soft metal composite. The concentrator teeth may be integrally coupled with the concentrator connector ring and extend either radially inward or outward. Again, feature may be shaped into the monolithic concentrator ring for improved performance and assembly. An anti-cogging feature may be configured on the concentrator airgap surfaces, for example, such as a depression in the airgap surface. The concentrator teeth may have axial profile features, such as a plurality of grooves to receive potting between magnetic poles and the concentrator teeth, for improved retention of the magnetic poles and structural support. These features may also be exploited to reduce cogging. A magnet ring retainer receiver may be configured between the concentrator teeth and the concentrator connector ring to enable a magnet ring retainer to be coupled thereto. A magnet ring retainer may be assembled, molded, pressed or cast around the concentrator ring such that the magnet ring retainer fills the magnet ring retainer receivers to provide structural support and to retain alignment and position of the concentrator teeth. The magnet ring retainer may extend from a first axial side to a second axial side of the concentrator ring. An exemplary magnet ring retainer may be a separate part that is inserted into the magnet ring retainer receivers with the magnet ring retainer extensions being configured to be inserted into the magnet ring retainer receivers; additional magnet ring material may be bonded or potted or molded to secure the magnet ring retainer extensions within the magnet ring receivers. A magnet ring retainer is configured to provide additional structural support of the concentrator ring and locate the magnet rings axially, one to another and so airgaps to armatures are properly positioned. A magnet ring retainer may be electrically conductive but not magnetically conductive. A magnet ring retainer may be plastic, such as a thermoplastic that flows in a molding around the concentrator ring or may include powder, such as copper, aluminum or stainless-steel powder that may include a binder and be pressed into the magnet ring retainer receiver. A magnet ring retainer may be cast aluminum or other non-ferrous metals. All of or a portion of the magnet ring retainer and concentrator ring may be machined off to reduce diameter, and weight and improve performance.

The electric machine of the present invention may be an electric motor or an electric generator. Assembly of the electric machine may be simplified by the addition of the structural features shaped into the monolithic components. The armature rings may have mating locating features that enable the stack to be aligned and retained in a circumferential alignment as well as positioned angularly. The coils may reside in coil channels formed in the armature connector rings, and the coil wires may extend through wire slots. The concentrator rings may be located between the armature rings and retained via potting or other means such as mechanical. The armature teeth may extend radially inward or outward. The armature ring or the magnet ring may be the rotating portion of the electric machine depending on the geometry and application.

A cooling channel may be configured in the armature ring to enable a flow of cooling fluid to prevent overheating for high power density electric machines. A cooling conduit may be configured between the radial gap extensions for the armature teeth and a cooling fluid may flow through the cooling conduit for cooling purposes. This space cannot be used for any other purpose and therefore does not increase the size of the machine, and is ideally located to remove heat from where the heat is generated by the cores and the coil.

In addition, an exemplary three-phase electric machine has six axial airgaps and/or three radial airgaps making a large sheer area per volume or the motor. Each phase's flux paths converge and wrap around a single central, and generally toroidal coil winding, or coil as used herein. As is typical of transvers flux motors, the disclosed arrangement allows pole count to be adjusted independently of coil area allowing for lower resistance coils, and therefore decreased resistance losses due to torque. Also, armature flux paths are shared between phases. These together allow for high torque per volume, mass and per cost, as well as lower core loss per torque and power. The arrangement of SMC components provides for tight control of airgap tolerance, no circumferential tolerance stack up, higher wire fill area, and near complete elimination of secondary operations.

The radial airgap armatures, weather combined with axial or only radial, allow for the shielding of the coil from fluctuating fields of the magnet rings where the output coil is stationary with respect to the magnet ring. This is important as frequencies become significant because these fluctuating fields will induce substantial losses if allowed to penetrate the coils. The combination of both axial and radial airgaps makes for the highest airgap sheer area and shields the coils from losses induced by fluctuating fields in the coils.

The SMC armature ring operates with favorable losses at high frequency compared to laminated steels. Shared armature flux paths lead to less overall armature core losses due to relatively little SMC mass/volume being excited per torque output.

Additionally, features are disclosed that reduce togging and allow for ideal sinewaves waveforms. An anti-cogging feature, such as a depression, in the axial surface of an armature tooth and/or concentrator tooth may be configured to reduce or prevent cogging. One or more of the teeth may be configured with the anti-cogging feature and this feature may be formed as an integral part of the SMC component during formation through compression of powdered metal.

An exemplary coil is a generally toroidal coil that may be formed of flat, square or round wire. Round wire is the lowest cost. Frequently, "Alpha windings" have been needed to avoid loss of coil volume due to the need for both coil winding ends needing to exit either on the inner diameter or outer diameter together depending on the arrangement. Without an "alpha wound" coil, a row or column is lost to allow the start or end of the coil to reach the same direction at the other end. What is disclosed is that by shaping the SMC and the coils as shown, a standard wind of wire may produce nearly the same ideal resistance coil at a fraction of the cost and difficulty.

An exemplary magnet ring may be composed of alternating magnets and flux concentrators where every other magnet is a low coercivity magnet. This allows for the net flux into the armature from the magnet ring to be adjusted by adjusting the field level and even flux direction of the low coercivity magnets with current pulses in the armature.

An exemplary electric machine may have a reduced part count, tolerance stack up, manufacturing costs, and improved performance consistency. An exemplary electric machine may include a monolithic magnet ring, where all flux concentrators from each magnet ring are formed together in one part and later in the process may be fully or partly separated to operate magnetically independently, and, an armature of axial and/or axial and radial flux paths where all poles per half phase are formed in the same part. The armature ring may have a torque key shaped and molded into the armature parts and provide for the alignment of each armature ring with an adjacent armature ring, and provides for torque transition. This further reduces part count, eliminating another tolerance, and reducing potential for slop between the motor and the output. This reduced manufacturing part count can reduce part counts from typically about 500 parts to about 10 parts, plus magnets. As importantly, an exemplary electric machine may include a monolithic concentrator ring, wherein the flux concentrators are shaped to extend from a concentrator connector ring, thereby precisely positioning each concentrator tooth that eliminates certain tolerance stack ups. This improves motor consistency and quality and allows for more options in design to reduce cogging and improved performance. These monolithic components allow for lower cost manufacturing, lower cogging, more perfect sinewaves and better manufacturing, better performance and better manufacturing consistency.

An exemplary electric machine may incorporate armature teeth that are shared armature teeth, that are positioned between two separate magnet rings and conduct magnetic flux from these two separate magnet rings. In an exemplary embodiment, a shared armature tooth extends radially from an armature connector ring and has axial airgap surfaces for conducting magnetic flux on opposing axial sides of the tooth. A shared armature tooth may be an integral part of a monolithic armature rings, a one piece component formed from soft metal composite (SMC), for example.

Almost all of these configurations may be configured for either inner rotating or outer rotating often using almost all the same tooling and parts.

In summary, high sheer gap area per volume by either axial, radial, or both axial and radial airgaps, located near the periphery of the motor/generator, with shared armature teeth between phases, with short flux paths requiring little mass (and loss), cooled with liquid cooling so it can operate at high specific loss, lead to a high value motor/generator of exceptional torque and power per size, weight, and cost. Added to this is that is a magnet ring where field levels are adjustable. This enhances higher RPM efficiency and performance, reduces controller costs by keeping generated voltage relatively level.

The specific arrangements show the following attributes: High air gap sheer area per volume and weight; Realtime adjustable operating flux density; Larger wire area and or a smaller and lighter motor/generator; Liquid or heat pipe cooling, both the along armatures and along coils provides high heat flow; Short and shared flux circuits reduce core material for reduced core loss, cost and weight; Poles that taper radially and circumferentially away from the airgap face to improve structural strength, lower core loss, and improve permeability; Transverse flux allows relatively low coil resistance losses; and Forming of all of each phases concentrators together and integration of armature poles and flux return parts together reduces part count on the order of 25 times, lowering costs and improving performance and consistency.

Magnet Ring

The motor arrangements start with the magnet ring. The magnet ring is composed of magnets alternating with flux concentrators. The magnets are magnetized in the thickness which is also a generally circumferential direction opposing each other and directing their flux into the concentrators. This allows flux to couple in both axial directions and in the radially directions to armatures. A variation is disclosed whereby high coercivity magnets that are very resistant to demagnetization, such as neodymium and the like, are alternated with lower coercivity magnets that are susceptible to demagnetization such as alnico magnets and the like. This new arrangement allows the magnet ring to be effectively demagnetized and re-magnetized real-time with armature current pulses in order to adjust field levels. This allows for operation at constant power levels across a wide speed range. It also allows for essentially no loss condition where the motor does no work but also has no loses. This is very useful where the motor is in only intermittent use such as electric bicycles, or ebikes, at certain operating points, or four-wheel drive vehicles where they are only needed under certain conditions, or as importantly, to adjust field levels that the motor/generator operates at where the power/torque required is highly variable and core losses would make efficiencies significantly lower and important operating points. Another important advantage is that the generated voltage can be maintained at a moderate level. Without this the motor and controller are subjected to far higher voltages at higher RPM. The controller cost will also be higher. An automotive example would be a car requiring low power such as when descending or slowing, where with full field, core losses would be high and power output would be low and the resulting efficiency would therefore be low. This arrangement allows for excellent efficiency under these conditions. It's important to note that this magnet ring arrangement and adjustment of the armature field levels by pulsed current in the armature to change the field in low coercivity magnets, can be used in many motor arrangements Another important disclosure of the magnet ring portion of this invention, is the single piece per phase axially pressed SMC concentrator ring. In an exemplary ring, concentrators are molded as one with an inner or outer connecting ring. Also disclosed is in the exemplary design is a narrow region where the concentrator's magnetic function ends and then the SMC extends to the connecting ring. This narrow portion reduces flux leakage and allows for a mechanical lock to the spacer ring. This mechanical locking improves the robustness of the mechanical design and construction. There are many additional advantages to this single part per phase ring design. The cost of pressing and processing the single part is lower than in an example, 80 individual parts. Also, of importance, is that, for each phase, only a single part needs to be handled vs in an example 80. This ring also precisely positions each concentrator in all three planes, axially, radially and angularly. This improves consistency of manufacturing and several aspects of performance including waveform and cogging. It also allows for as many as every concentrator having a different design without increasing cost or complexity for manufacturing. This can be an important design variable for voltage wave shaping, cogging and other design aspects that are not practical with individual parts.

These configurations may be configured for either inner rotating of outer rotating often using almost all the same tooling and parts.

Armatures

Armatures maybe made with radial airgaps alone, or axial airgaps alone, however the preferred version employs both axial and radial airgaps. In some cases, it will be preferable to use only axial or radial airgap configurations.

The armatures may be constructed from discrete poles with integrated return paths or with separate return portions (may be referred to as toroidal returns or connecting rings), or the whole armature and return and other features formally separate parts or simply not possible, may be integrated into a single pressed SMC part. Use of discrete parts may be preferable where the scale of the motor is too large for available presses, or the volume of the motors required may not justify the tooling costs for an integrated part, or, because the preferred press direction may be different, it may be that the design features available of the discrete part armature or the integrated armature are critical to a design goal of the motor or generator.

An exemplary electric machine may be an inner rotating motors and outer rotating motor. In most cases the SMC monolithic parts remain very similar or the same, thereby reducing tooling cost. An exemplary electric machine may be an inner rotating electric machine with both axial and radial airgaps where the armature return is around the outer diameter rather than the inner diameter and the coil is placed around the outer diameter of the magnet ring. This arrangement reduces the torque but may be preferred for certain applications. An exemplary electric machine may have an arrangement where the winding coils are arranged to terminate on the outer diameter of the motor or the inner diameter of the motor.

An exemplary shaped armature may comprise a coil recess forming a coil channel between adjacent armature rings, so that a larger area for coils is accommodated while maintaining fairly constant flux levels and thus higher permeability and lower core loss levels. This is enabled by the careful shaping of poles outside the airgap area in order to increase cross sectional area to the full circumference, or nearly so, where the pole joins the armature ring, less axial extent of SMC is required to carry the same flux. This reduced SMC axial extent allows for more axial extent of coil space. Alternatively, the shaping may be optimized to reduce flux levels in the coil region. Lowering flux levels will drop core losses and improve permeability.

The pole shaping, in this way, also improves the strength or the armature. Shape is optimized in the airgap area for torque generation, wave form shaping and reduced cogging, then the pole shape expands circumferentially and radially while tapering out of the airgap regions.

Various three-dimensional shape features are made in the airgap region, such as simple recesses with radii to reduce cogging. In particular, recesses with radii are used differently in inner phase compared to outer phases while perhaps even using the same tool to produce the part just placing the part in an inverted position. For simplicity, an anti-cogging feature includes face recess that are circular and filleted however a multitude of shapes are practical on as many pole regions as may be desirable without increasing tooling or production costs.

In some cases, it may be advantageous to include some secondary operations to reduce part tooling. For example, armature rings or armature teeth may be machined for incorporating them on the ends of a multiphase machine, wherein outer features are not required. Likewise, a coil channel or cooling channel may be machined into an armature ring subsequent to these parts being shaped and formed out of SMC.

An exemplary armature allows for higher revolutions per minute (RPM) where the coil windings move with respect to the magnet ring. In this arrangement, where the coils move with respect to the magnet ring, eddy currents develop in coil that cause losses. The disclosed armature includes radial airgap poles between the coil windings and the magnet ring. They increase torque output of the machine and also shield the coil windings from alternating fields that would otherwise cause high eddy currents in the coil windings.

An exemplary armature may be thicker axially on the inner, flux sharing phase armatures. This can be beneficial for cogging reduction and wave form shaping.

Similarly, the pole need not have flat or parallel walls, or cylindrical shapes and any profile may be employed to provide performance advantages, such as reduced cogging or increased airgap area. They may for example be conical, or toroidal, or grooved with a "ruffles potato chip" like profile for increased surface area or other advantages. In another example, the lack of the need for parallel walls allows the armature to widen and distribute structural and flux load circumferentially and axially to advantage. The airgap may not be uniform is width across the airgap, in a radial or axial direction. The width may increase from an inner diameter to an outer diameter, for example or could have fluctuations in width across the airgap.

Shaped soft metal composite as used herein is a monolithic component that is formed through the compression of powdered metal in a shaped mold.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 3 shows a perspective view of an exemplary shaped armature tooth having both axial airgap and radial airgap surfaces, connector ring coupling portions on the connected end for locating the armature tooth on the armature connector ring and flow channels radially and circumferentially on the extended end and connected end for receiving potting to provide support between and around poles when potted.

FIG. 4 shows a perspective view of an exemplary armature connector ring having four armature teeth coupled thereto by the connector ring coupling portions, protrusions, being inserted into the armature tooth coupling portion, apertures; this precise positioning forms channels between armature teeth for receiving structural support material, potting, and locates angles and positions poles around slot to avoid bridging.

FIG. 5 shows a perspective view of an armature connector ring which may be used to couple armature teeth thereto and form a toroid return ring.

FIG. 6 shows a perspective view of an armature connector ring having a current slot for interrupting a circumferential path of any current.

FIG. 7 shows a perspective view of an armature connector ring with a current slot as in FIG. 6 and a circumferential slot for locating an armature tooth.

FIG. 1.2 shows cross-sectional view of a three-phase electric machine incorporating armature rings and armature teeth as shown in FIG. 11.

FIG. 0.18 shows an exemplary three phase electric machine section incorporating armature rings, as shown in FIG. 16, stacked to form a three-phase electric machine.

FIG. 22 shows an exemplary magnet ring having an alternating arrangement of magnets and flux concentrators.

FIG. 23 shows an enlarged perspective view of a single pole combination of a magnet and a flux concentrator.

FIG. 24 shows an enlarged perspective view of an exemplary pole pair having a thin and high coercivity magnet configured adjacent to a flux concentrator followed by a thick and low coercivity magnet configured adjacent another flux concentrator.

FIG. 29 shows flux sharing patterns of FIG. 27 predominantly encircling the first and second phases.

FIG. 30 shows flux sharing patterns of FIG. 27 predominantly encircling the first and third phases.

FIG. 31 shows flux sharing patterns of FIG. 27 predominantly encircling the second and third phases.

FIG. 32 shows flux sharing patterns of FIG. 27 with highest field levels in the second phase.

Figure 1:
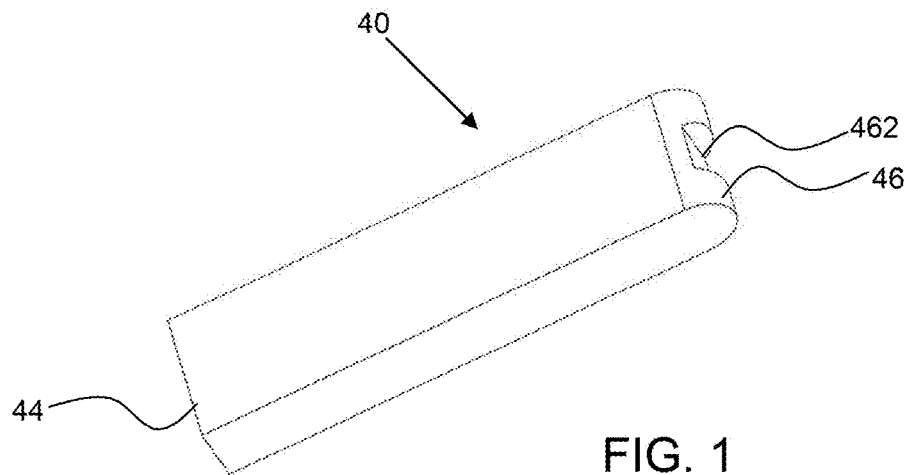
FIG. 1 shows a perspective view of an exemplary shaped armature tooth configured to be coupled with an armature connector ring to form armatures.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Figure 2:
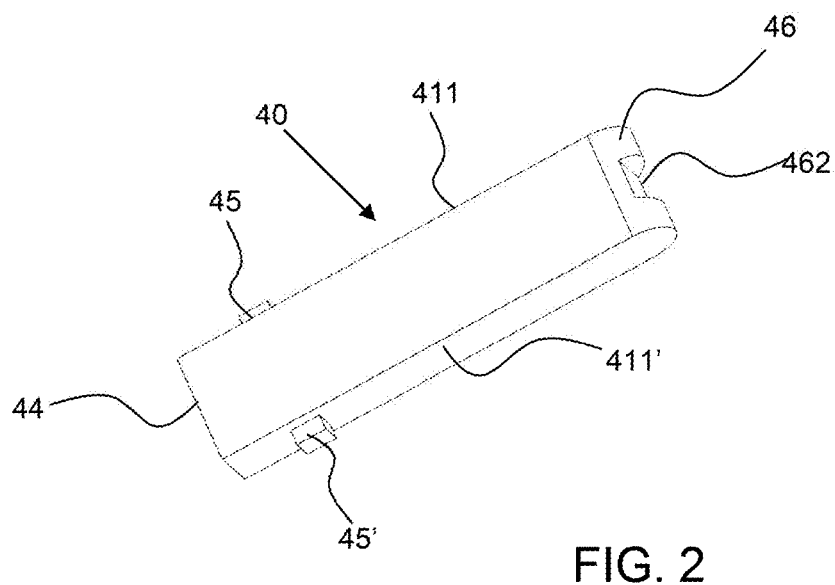
FIG. 2 shows a perspective view of an exemplary shaped armature tooth with a connector ring coupling portion used for locating the armature tooth on the armature connector ring.

Referring now to FIGS. 1 to 3, an exemplary shaped armature tooth 40 has a length from a connected end 44, or end proximal to connection with an armature connector ring, to an extended end 46. As shown in FIG. 1, an end flow channel 462, a recess in the extended end, is configured to provide additional structural support when the armature tooth is potted. The potting material will flow into this recess to produce a stronger armature ring. As shown in FIG. 2, the shaped armature tooth 40 has connector ring coupling portions 45, 45', protrusions extending from the opposing circumferential surfaces 411, 411', respectively. As shown in FIG. 3, the shaped armature tooth 40 has radial gap extensions 47, 47' extending from the circumferential surfaces to form radial surfaces 41 and to produce radial airgaps with the magnet ring. The shaped armature tooth of FIG. 3 also has connected end flow channel 442, recesses in the axial surfaces 42, for receiving potting to produce a stronger armature ring. The armature tooth also has a tapered extension in the axial surface with the toroidal return to optimizes the flux coupling to the return.

As shown in FIG. 4, armature teeth as shown in FIG. 3 are coupled to an armature connector ring 32 to produce an armature tooth tip 401, or portion of the armature tooth that extends from the armature connector ring 32. The connector ring coupling portions 45 of the armature teeth 40 are inserted into the armature tooth coupling portions 34 or the armature connector ring 32. The armature ring has a radial length from an outside surface 33 to the inside surface 31. The precise positioning of the armature teeth forms channels between armature teeth for potting material to flow. This provides mechanical strength and allows to good material flow during molding. The precise positioning also locates poles so that poles do not bridge the connector ring cut which prevents circumferential currents to flow.

As shown in FIG. 4, the electric machine 10 has an axial axis 12 that extends axially through the rotational direction of the armature ring and/or magnet ring, a radial axis 11 that extends radially outward from the axial axis and a circumferential axis 13, that extends circumferentially about the axial axis. An axial surface or airgap is configured orthogonally to the axial axis, a radial surface or airgap is configured orthogonally to the radial axis and a circumferential surface is configured orthogonally to the circumferential axis. Orthogonally, as used in the previous sentence means substantially perpendicular to and a surface or airgap may include surface features, such as groves, slots, keyways, locating features, that interrupt a strictly orthogonal surface. This axis convention will be used throughout the application.

FIG. 5 shows a perspective view of an armature connector ring 32.

FIG. 6 shows a perspective view of an armature connector ring 32 having a current slot 377 for interrupting a circumferential path of any current.

FIG. 7 shows a perspective view of an armature connector ring 32 with a wire slot 37 and a coil slot 49, a circumferential slot for locating poles radially but not angularly.

Figure 8:
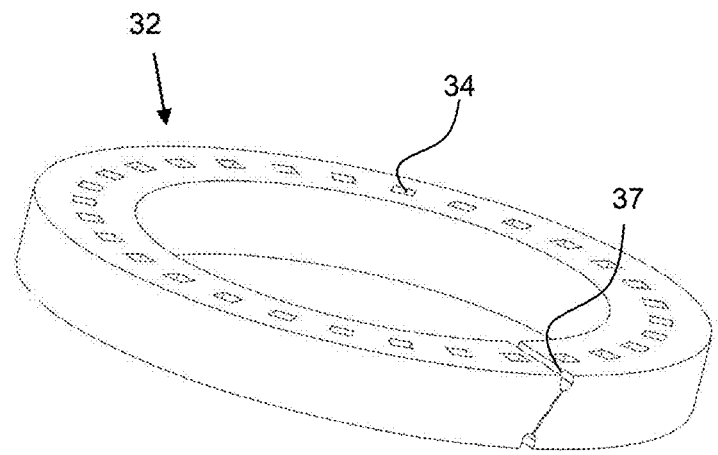
FIG. 8 shows a perspective view of an armature connector ring with armature tooth coupling portions, apertures for receiving and retaining armature teeth, and a wire slot for coil wires to extend through to the coil, shown in FIG. 9.
Figure 9:
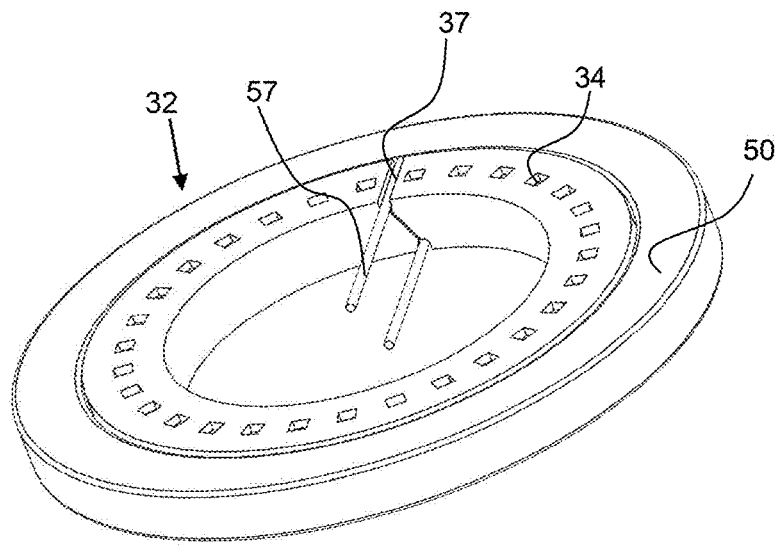
FIG. 9 shows a perspective view of the armature connector ring of FIG. 8 with the coil wires extending from the coil through the wire slot.

FIG. 8 shows a perspective view of an armature connector ring 32 with armature tooth coupling portions 34, apertures for receiving and retaining armature teeth and a wire slot 37 for coil wires to extend through to the coil in the coil slot, shown in FIG. 9.

FIG. 9 shows a perspective view of the armature connector ring 32 of FIG. 8 with a coil 50 configured around the at mature connector ring and the coil wires 57 extending radially inward through the wire slot 37.

Figure 10:
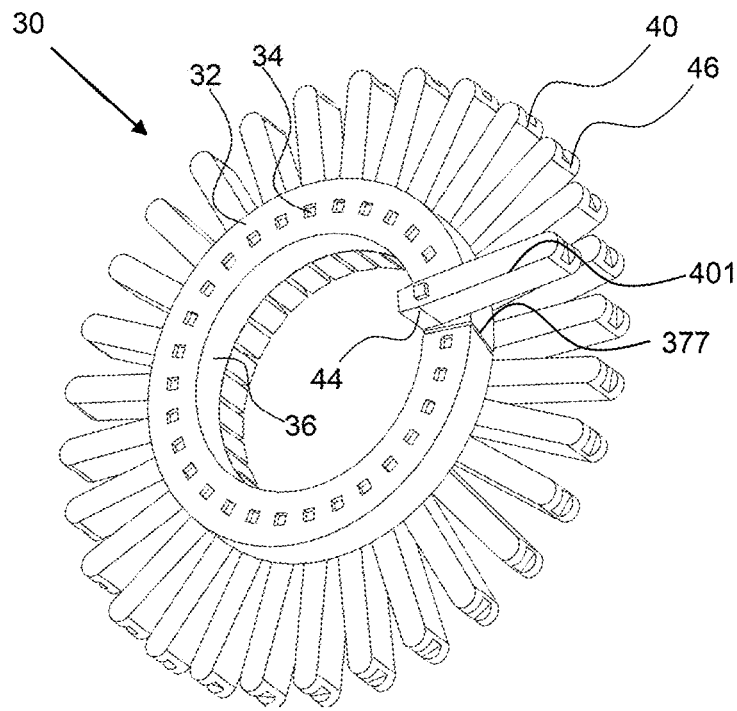
FIG. 10 shows a perspective view of an exemplary armature ring with armature teeth coupled to a toroidal return portion of the armature connector ring and a current slot as shown in FIG. 6, extending radially in the armature connector ring.

As shown in FIG. 10, an exemplary armature ring 30 is configured with armature teeth 40 coupled to the armature connector ring 32 and a circumferential current interrupting slot 37 extending radially in the armature connector ring. The armature teeth 40 have an armature tooth tip 401 portion that extends from the armature connector ring 32. The armature connector ring forms the toroidal return 36 for each phase.

Figure 11:
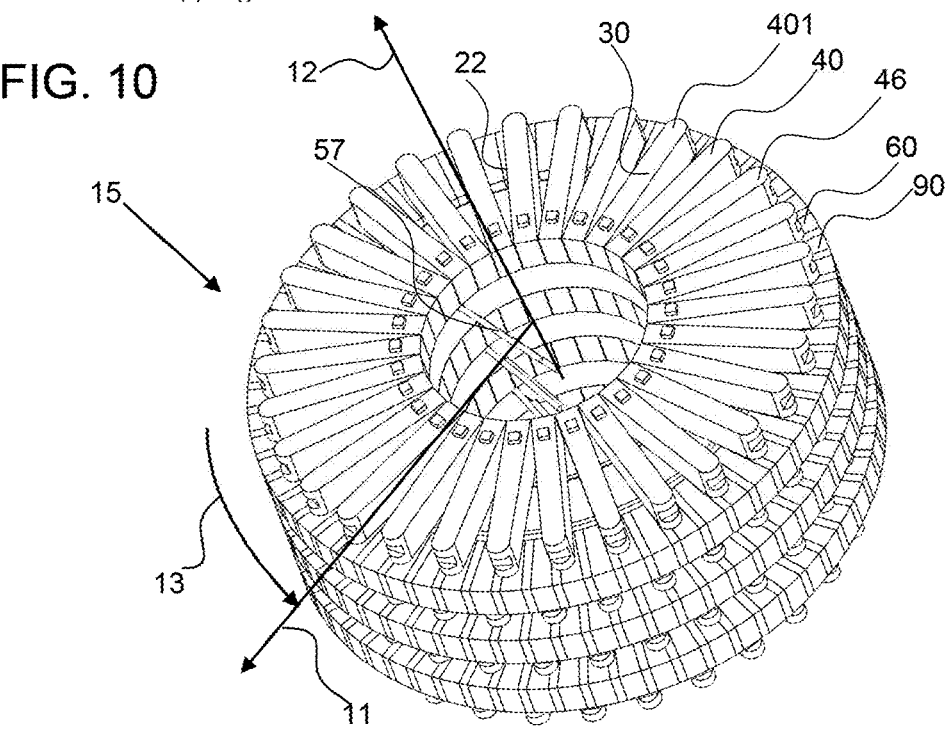
FIG. 11 shows a perspective view of an exemplary three phase electric machine having armature rings comprising armature teeth configured around magnet rings to form axial airgaps and the coil wires extending into the interior diameter through the coil wire slot.

As shown in FIG. 11, an exemplary three phase electric machine 15 has armature rings 30 comprising armature teeth 40 and connector ring 32, configured on either side of magnet rings 60 to form axial airgaps 22. Also, the coil wires 57 are shown extending through wire channel 37 of connector ring 32, into the interior diameter through the coil wire slot. The armature teeth tip 401 portions extend over the magnet ring 60 to produce axial airgaps 22 therebetween. The two center circumferential sets of armature teeth form a ring of shared armature teeth, that conduct flux from magnetic rings on opposing axial sides of the armature teeth. The end armature teeth only have one magnet configured axial in from the end set of armature teeth.

Figure 12:
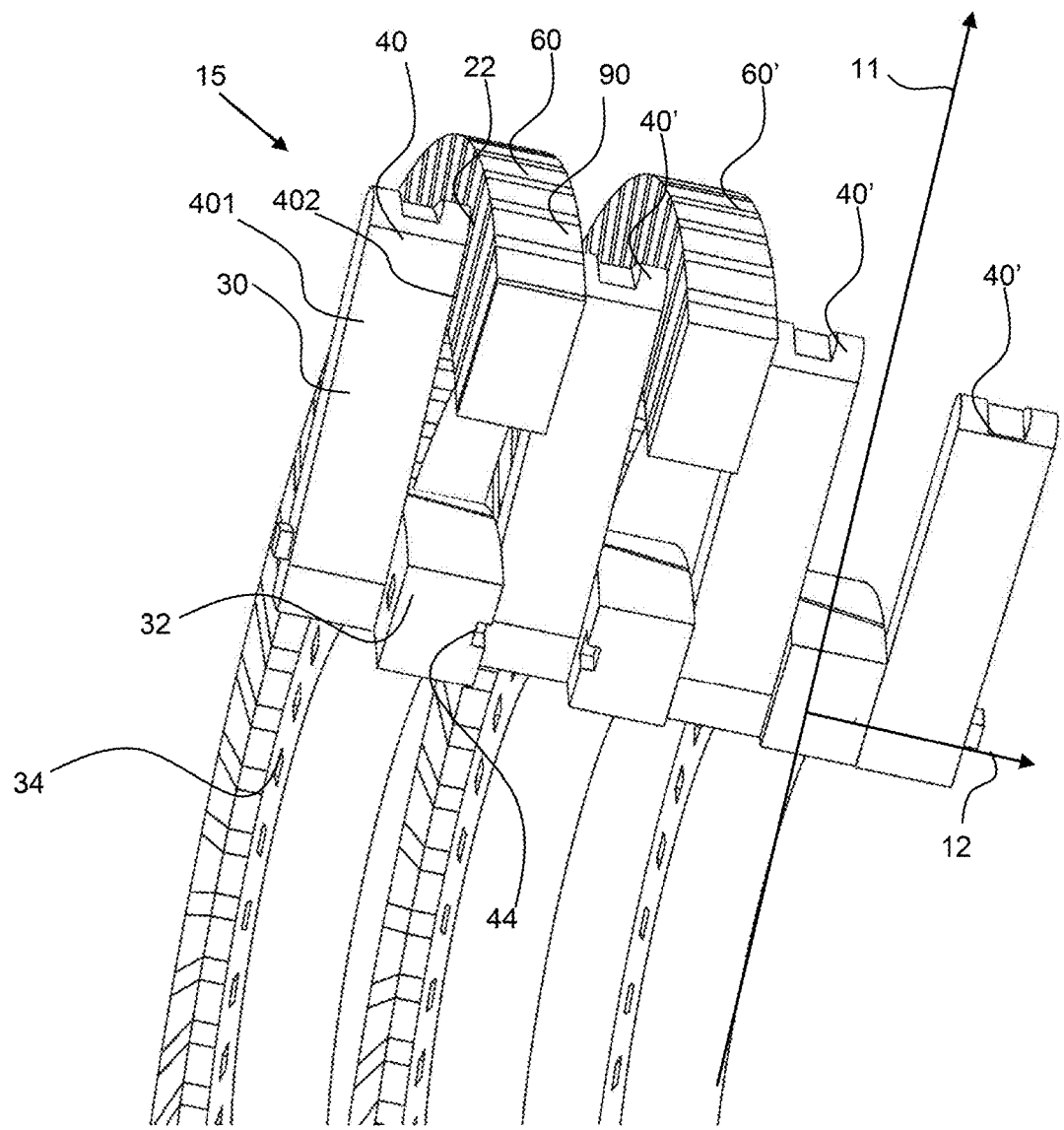

As shown in FIG. 12, a partial assembly of a three-phase electric machine 15 incorporates armature connector rings 32 and armature teeth 40 as shown in FIG. 11. The armature teeth are coupled to the armature connector rings by the connector ring coupling portions 44, protrusions, being inserted into the armature tooth coupling portions 34, apertures. The armature teeth tip 401 portions extend over the magnet ring 60 to produce axial airgaps 22 therebetween. As shown, only a portion of the armature tooth tips 401 overlap the magnet ring to form the axial airgaps. The axial airgap portion 402 of the tooth tips 401 is the portion where magnetic flux is transferred from the magnet ring to the armature tooth 40. The two center circumferential sets of armature teeth 40' 40" are shared armature teeth that conduct magnetic flux from magnetic rings on opposing axial sides of the armature teeth. For ease of illustration, not all of the magnet rings are shown. Armature tooth 40' is configured axially between magnet rings 60 and 60' and conducts magnetic flux from each and is therefore a shared armature tooth. The armature connector ring has two sets of armature teeth coupled thereto.

Figure 13:
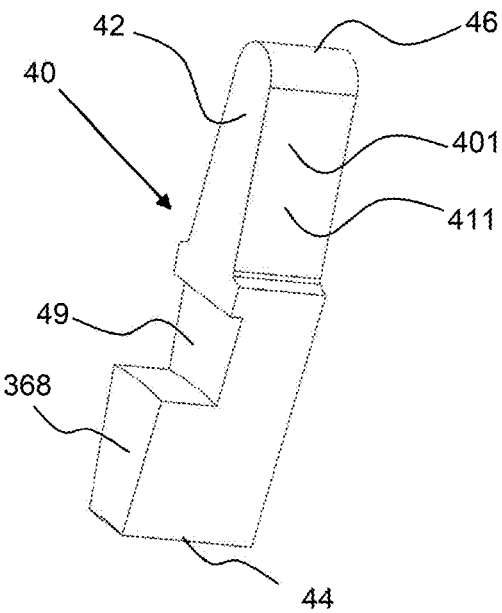
FIG. 13 shows a perspective view of an exemplary shaped armature tooth that tapers from a connected end to an extended end and having an axial slot for receiving a coil and flux returns extensions incorporated into the armature tooth.
Figure 14:
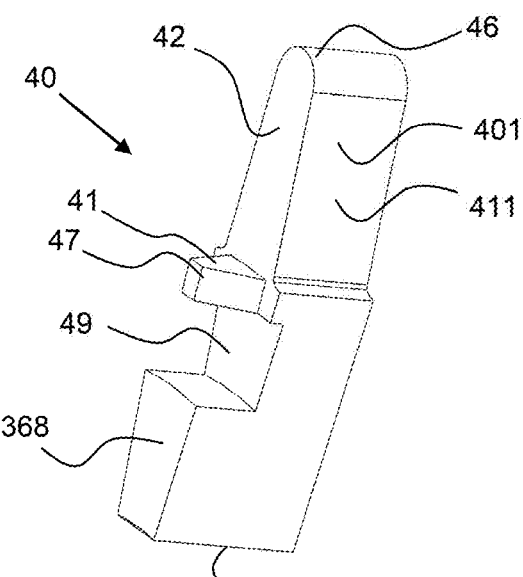
FIG. 14 shows a perspective view of an exemplary shaped armature tooth that tapers from a connected end to an extended end and having a wider axial slot for receiving a coil that is wider axially than the radial air gap extensions incorporated into the shaped armature tooth, and flux return extensions.
Figure 15:
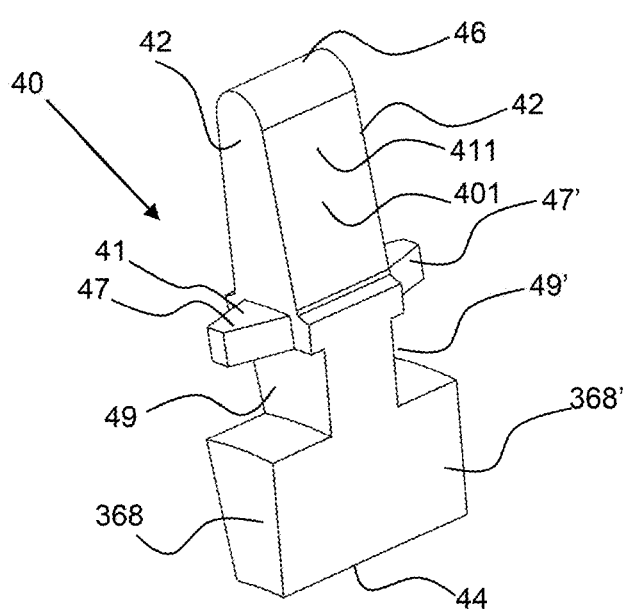
FIG. 15 shows a perspective view of an exemplary shaped armature tooth that tapers from a connected end to an extended end and having a wider axial slot for receiving a wider axial coil, flux returns extensions, and radial air gap extensions that extend from opposing axial surfaces of the armature tooth.

Referring now to FIGS. 13 to 15, exemplary shaped armature tooth 40 taper from a connected end 44 to an extended end 46. The shaped armature tooth has circumferential surfaces 411 and axial surfaces 42 and flux return extensions 368 that extend from the axial surface. The teeth have coil slots 49 for receiving a coil which is deeper axially that the airgap surface, providing for more coil area. As shown in FIG. 14, a radial gap extension extends from an axial surface 42 of the shaped armature tooth 40 to form a radial tooth, or radial gap extension having radial surfaces 41 that form a radial airgap with the magnet ring. As shown in FIG. 15, radial gap extensions extend from opposing axial surfaces of the shaped armature tooth. The armature teeth 40 have an armature tooth tip 401 portion that extends from the armature connector ring 32.

Figure 16:
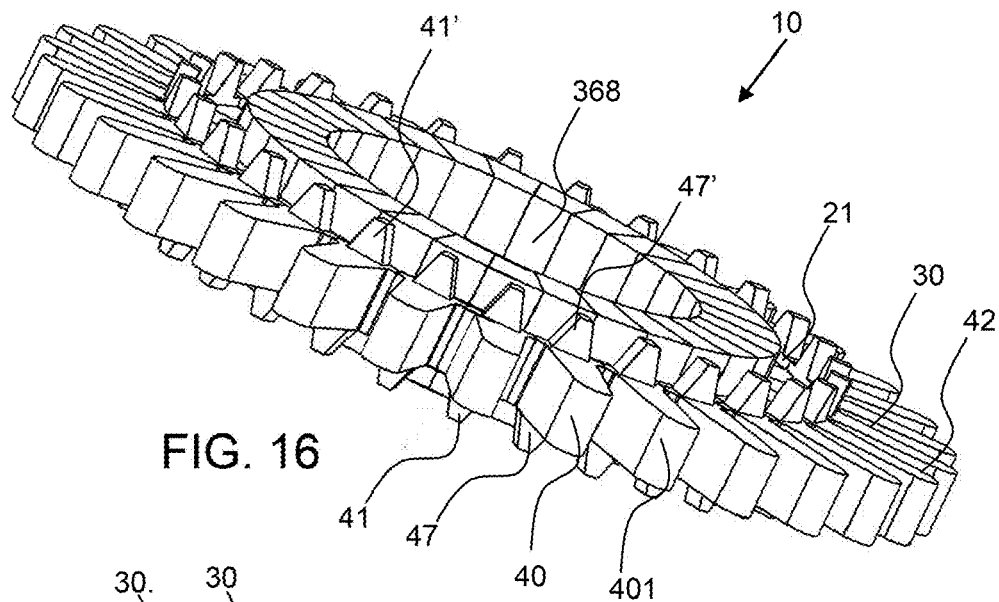
FIG. 16 shows a perspective view of an exemplary armature ring formed by the arrangement of the shaped armature teeth shown in FIG. 15, in a circumferential array.
Figure 17:
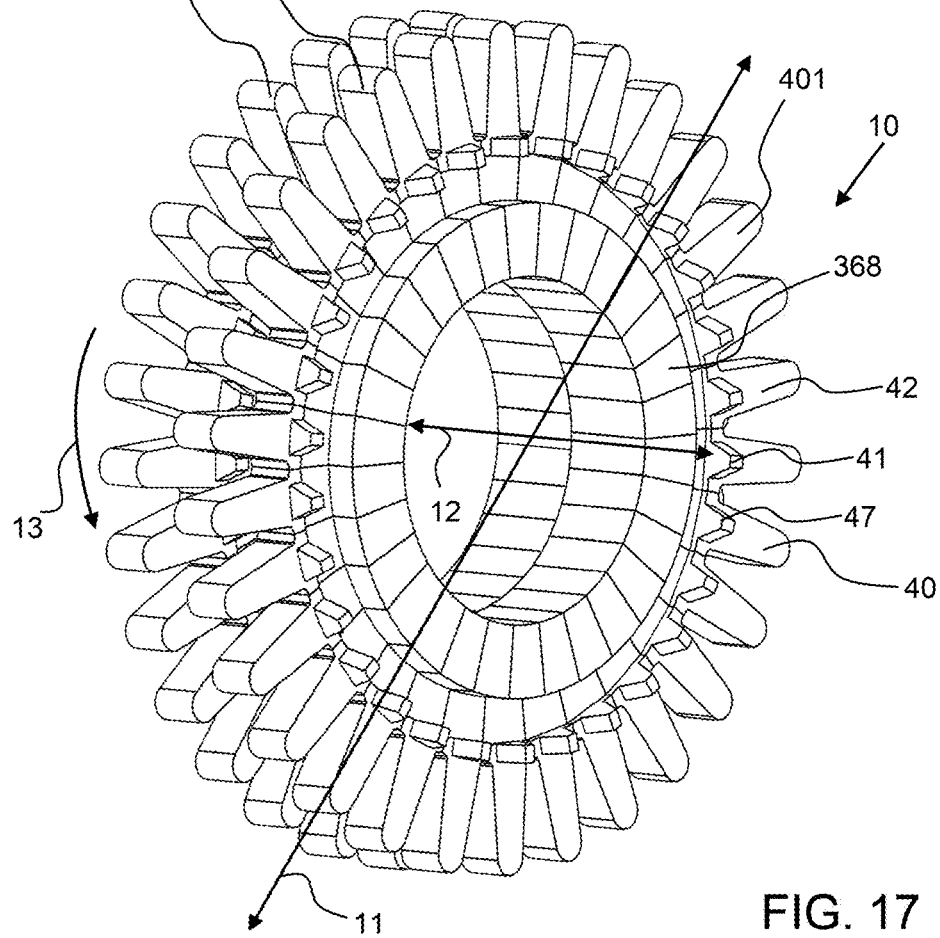
FIG. 17 shows an exemplary phase section incorporating two armature rings as shown in FIG. 16 stacked to form a single-phase electric machine.
Figure 18:
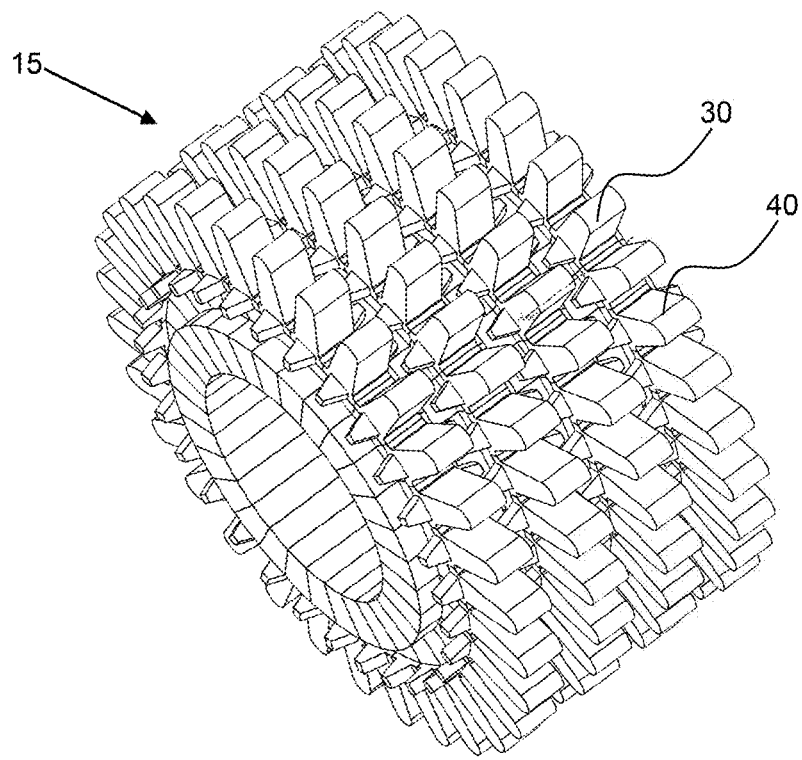
Figure 19:
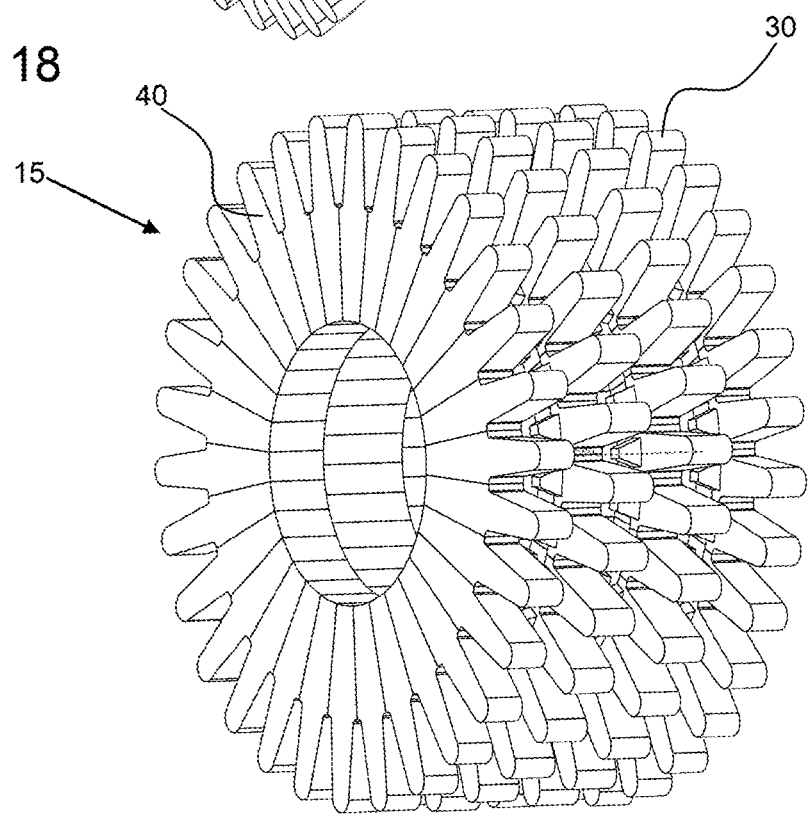
FIG. 19 shows a perspective view of a three-phase electric machine having armature teeth, as shown in FIG. 14, configured on the ends of the armature ring stacks.

Referring now to FIGS. 16 to 19, an exemplary armature ring 30 is formed by the arrangement of the shaped armature teeth 40 shown in FIG. 15, in a circumferential array. As shown in FIG. 17, two armature rings 30, 30', as shown in FIG. 16, are stacked to form a single-phase electric machine 15. As shown in FIG. 18, four armature rings 30 are stacked to form a three-phase electric machine 15. As shown in FIG. 19, a three-phase electric machine has armature teeth 40, as shown in FIG. 15 on the two middle armature rings, and as shown in FIG. 14, configured on the ends of the armature ring 30 stacks. As shown in FIGS. 18 and 19, the two axially centered armature rings 40 have a single sets of armature teeth that are shared armature teeth that conduct flux from magnet rings on opposing axial sides of the armature teeth. There are not two sets armature teeth configured axially between the magnet rings in this configuration.

Figure 20:
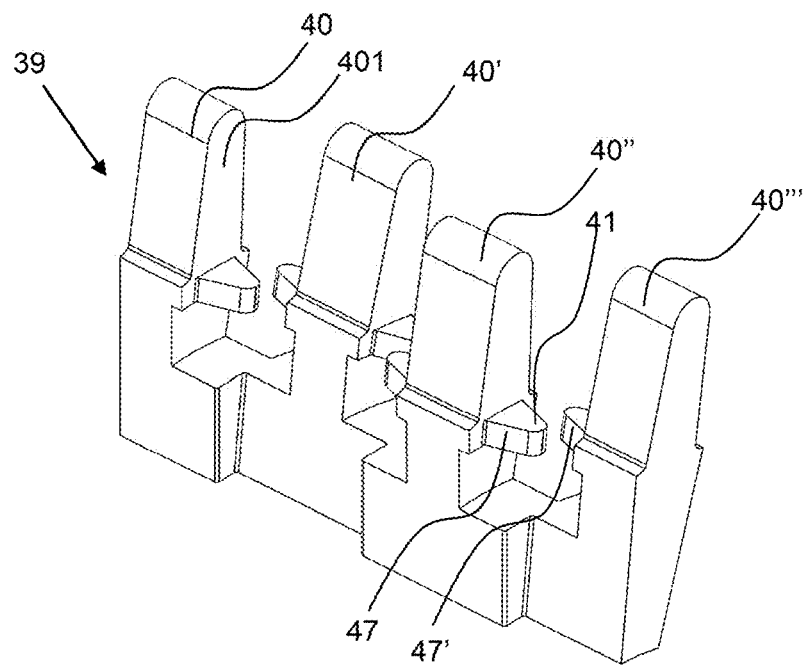
FIG. 20 shows a perspective view of a shaped axial armature assembly that is configured to extend axially in the electric machine, as shown in FIG. 21.
Figure 21:
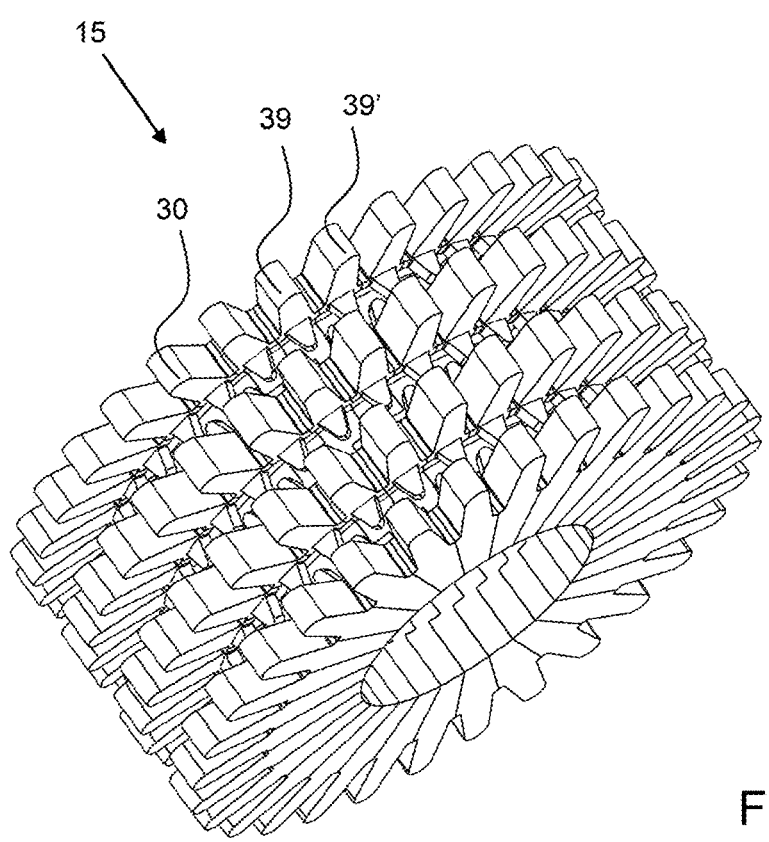
FIG. 21 shows a perspective view of three phase electric machine having shaped axial armature assemblies shown in FIG. 20 forming an armature ring.

Referring now to FIGS. 20 and 21, an exemplary shaped axial armature assembly 39 has a plurality of armature teeth 40-40''' configured to extend axially in the electric machine, as shown in FIG. 21. The circumferential array and assembly of the shaped axial armature assembly 39 forms armature rings 30 for a three-phase electric machine 15.

FIG. 22 shows an exemplary magnet ring 60 having an alternating arrangement of magnets 63 and flux concentrators 61, 61'.

FIG. 23 shows an enlarged perspective view of a single pole combination of a magnet 63 and a flux concentrator 61.

FIG. 24 shows an enlarged perspective view of an exemplary pole pair, or an arrangement of magnets and flux concentrators, having a thin and high coercivity magnet 68 configured circumferentially adjacent to a flux concentrator 61 followed by a thick and low coercivity magnet 66 configured circumferentially adjacent another flux concentrator 61'. An exemplary magnet ring is configured with a repeating units as shown in FIG. 24. A magnet ring may have the repeating arrangement of magnets and flux concentrators with a first flux concentrator circumferentially arranged following the high coercivity magnet, followed circumferentially by the low coercivity magnet and a second flux concentrator circumferentially arranged following the low coercivity magnet. The field strength of the low coercivity magnet may be changed by a pulse of current in the coil. A controller may do this to reduce drag, such as when the revolutions per minute are above a threshold and the torque requirement input is below a threshold level, such as when coating downhill when the electric machine is coupled with a wheel of a vehicle. The field strength may be dropped by at least 20% or more, 50% or more, 70% or more or may be adjusted down to substantially zero or even reversed.

Figure 25:
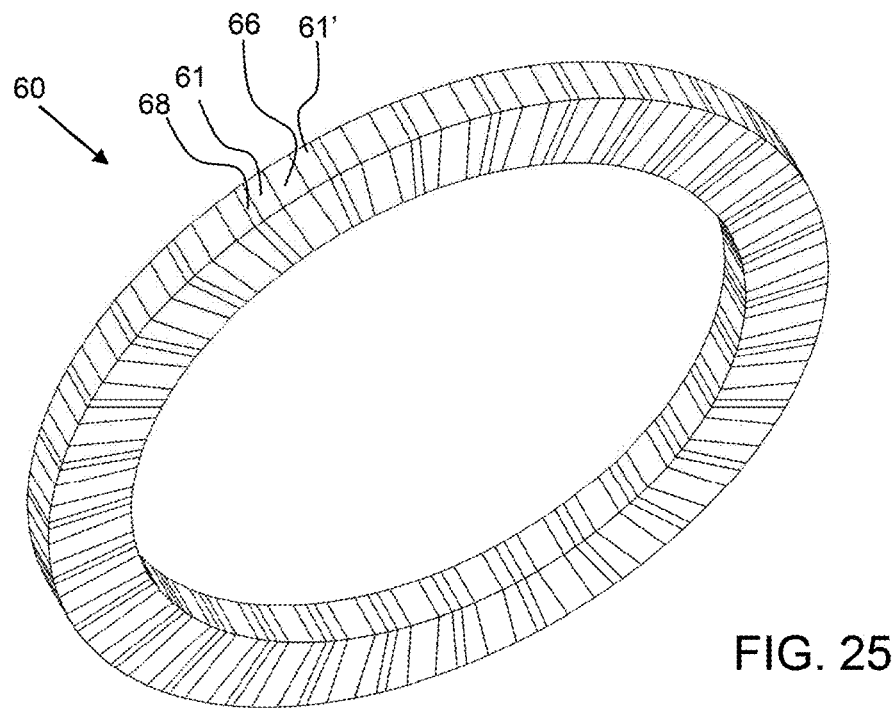
FIG. 25 shows a perspective view of magnet ring composed of the pole pairs shown in FIG. 24.

FIG. 25 shows a perspective view of magnet ring 60 composed of the pole pairs shown in FIG. 24.

Figure 26:
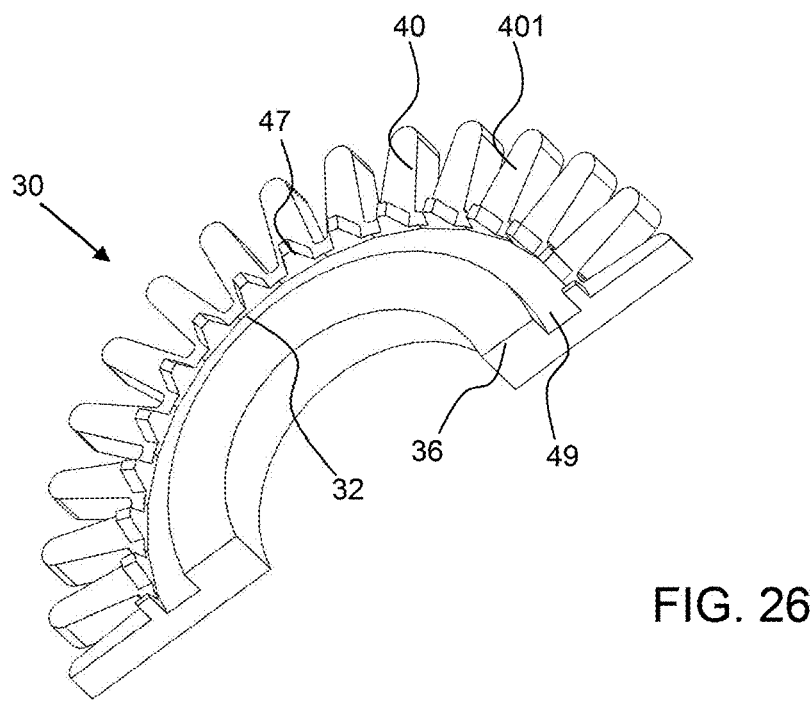
FIG. 26 shows a perspective view of a portion of an exemplary shaped armature ring having armature teeth extending from an armature connector ring, a coil slot and a toroidal return.
Figure 27:
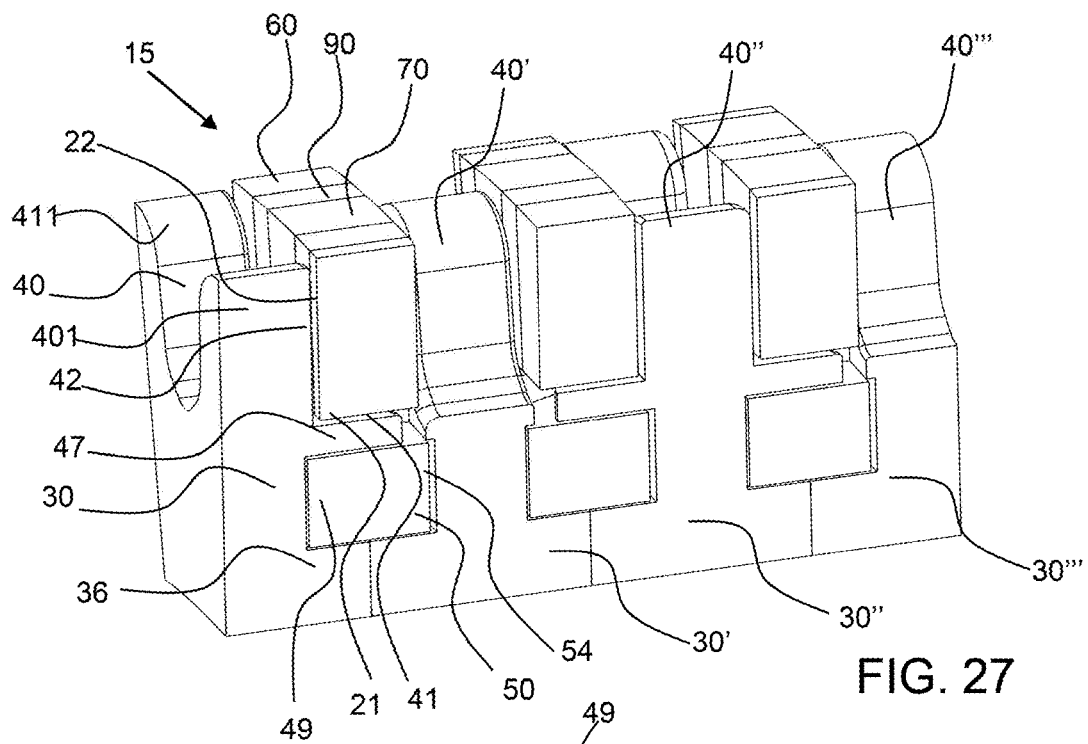
FIG. 27 shows a cross-sectional view of portion of an exemplary three-phase electric machine having an arrangement of armature rings shown in FIG. 26 with the coil configured between the armature rings in coil slots and magnet rings forming both radial airgaps and axial airgaps with the armature, and wherein the armature teeth are shared armature teeth.
Figure 28:
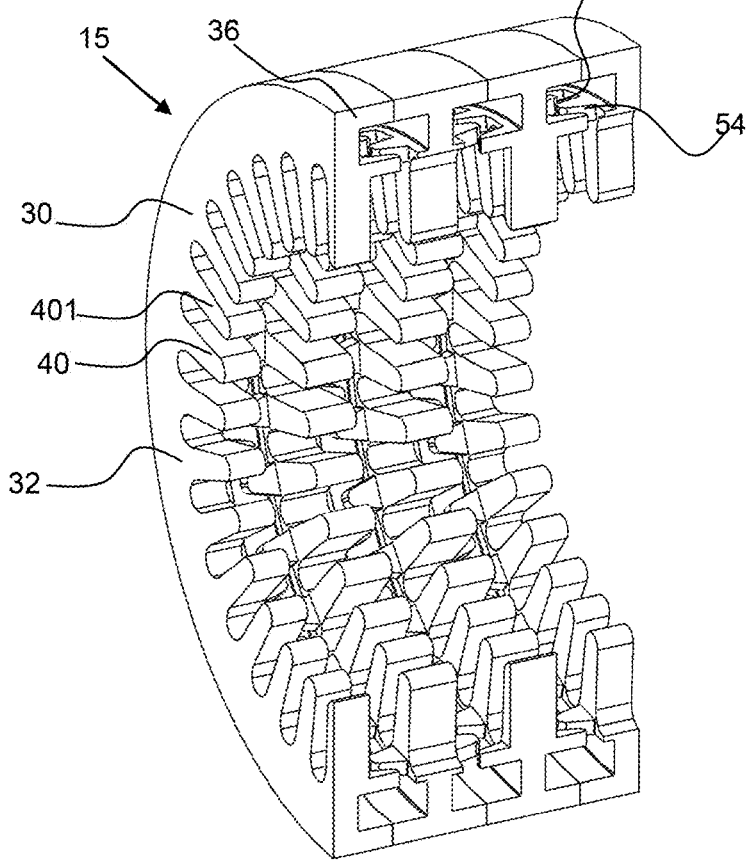
FIG. 28 shows a cross-sectional view of an armature arrangement for a three-phase electric machine comprising the shaped armature rings where the flux return portion is on the outer diameter of the electric machine and wherein coils are located around the outer diameter of the magnet rings.

Referring now to FIGS. 26 to 28, an exemplary armature ring 30 is a monolithic shaped armature ring 40 including an array of radially extending and tapering armature teeth 40 that extend from an armature connector ring 32, a toroidal return 36 and a coil slot 49 configured to receive a coil 50. The armature teeth tip 401 portions extend over the magnet ring 60 to produce axial airgaps 22 therebetween. A radial gap extension 47 is also part of the monolithic armature ring 30, thereby producing both radial airgaps 21 and axial airgaps 22 between the magnet ring 60 and the radial surface 41 and axial surface 42, as shown in FIG. 27. Each of the armature teeth 40-40''' has an axial airgap portion, wherein the armature tooth overlaps the magnet ring to produce an axial airgap and a radial airgap portion, wherein the armature tooth overlaps the magnet ring to produce a radial airgap. The armature teeth are offset circumferentially as shown in FIG. 28, so only two of the armature rings 30, 30'' shown in FIG. 27 show both the axial and radial airgap portions.

As best shown in FIG. 27, the coil channel 54 formed by the two coil slots 49, is wider axially than the width of the radial air gaps 21 and the width of the magnet ring, thereby providing increased current capacity. As shown in FIG. 28, a three-phase electric machine 15 comprises the shaped armature rings 30 where the flux return portion is on the outer diameter of the electric machine and wherein the coil is located around the outer diameter of the magnet rings. This arrangement maybe preferred where the heat path in around the outside diameter of the machine.

As shown in FIG. 28, the armature teeth 40 extend radially inward and the armature connector ring and armature teeth are a monolithic component.

FIG. 29 shows flux sharing patterns of FIG. 27 predominantly encircling the first and second phases.

FIG. 30 shows flux sharing patterns of FIG. 27 predominantly encircling the first and third phases.

FIG. 31 shows flux sharing patterns of FIG. 27 predominantly encircling the second and third phases.

FIG. 32 shows flux sharing patterns of FIG. 27 with highest field levels in the second phase.

Figure 33:
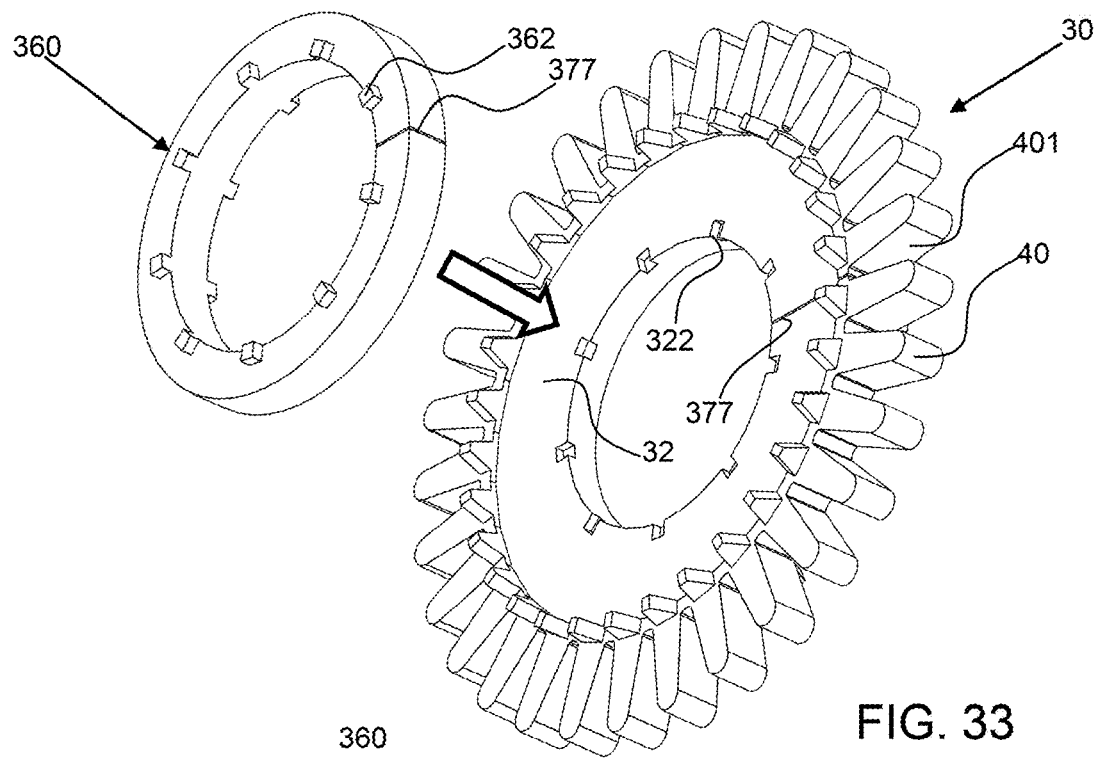
FIG. 33 shows a perspective view of an armature ring as shown in FIG. 26 with a separate toroidal return having locating features for locating the toroidal return with the armature ring via armature ring locating features.
Figure 34:
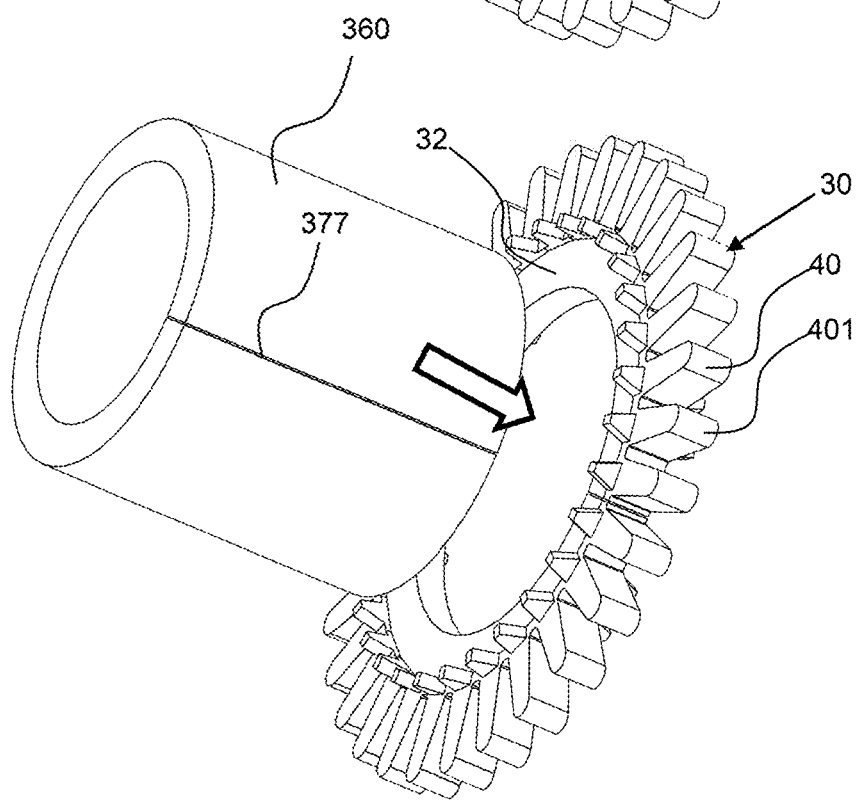
FIG. 34 shows a perspective view of an armature ring as shown in FIG. 26 with a separate toroid return configured for a three-phase machine; a single armature ring is shown.
Figure 35:
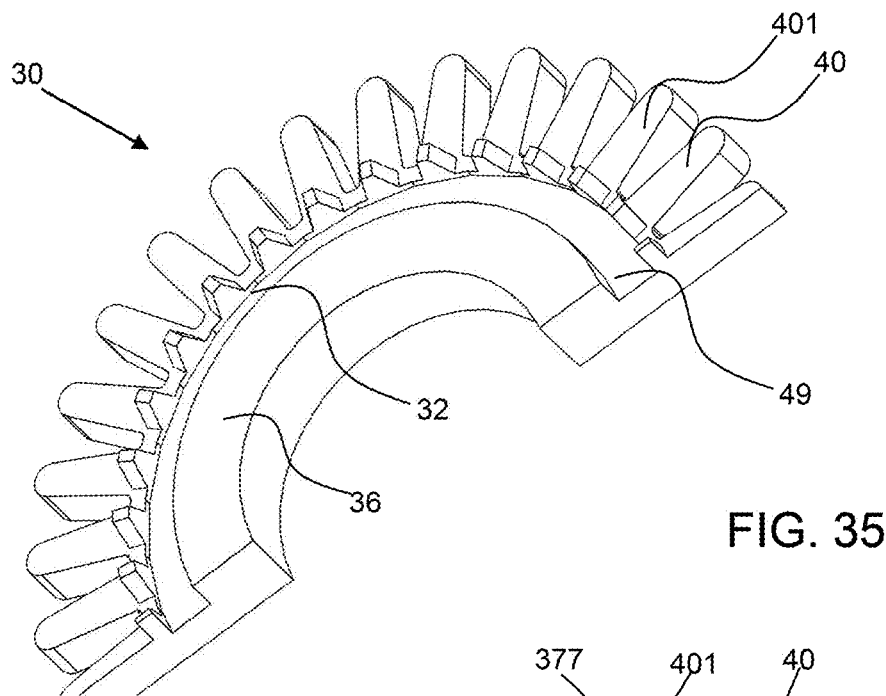
FIG. 35 shows a perspective view of a portion of the shaped armature ring shown in FIG. 26 with an integrated toroidal return, coil slot and with only one side having radial gap extensions.

Referring now to FIGS. 33 and 34, an armature ring 30 as shown in FIG. 26 is configured to receive a separate toroidal return 360 having locating features 362 for locating the toroidal return with the armature ring via armature ring locating features 322. The toroidal return 360 also has a current slot 377 to prevent current flow circumferentially around the return. The armature ring also has a current slot 377' as shown in FIG. 33. As shown in FIG. 34, a toroidal return may be configured for a multiphase electrical machine and extend through a plurality of armature rings 30.

Figure 36:
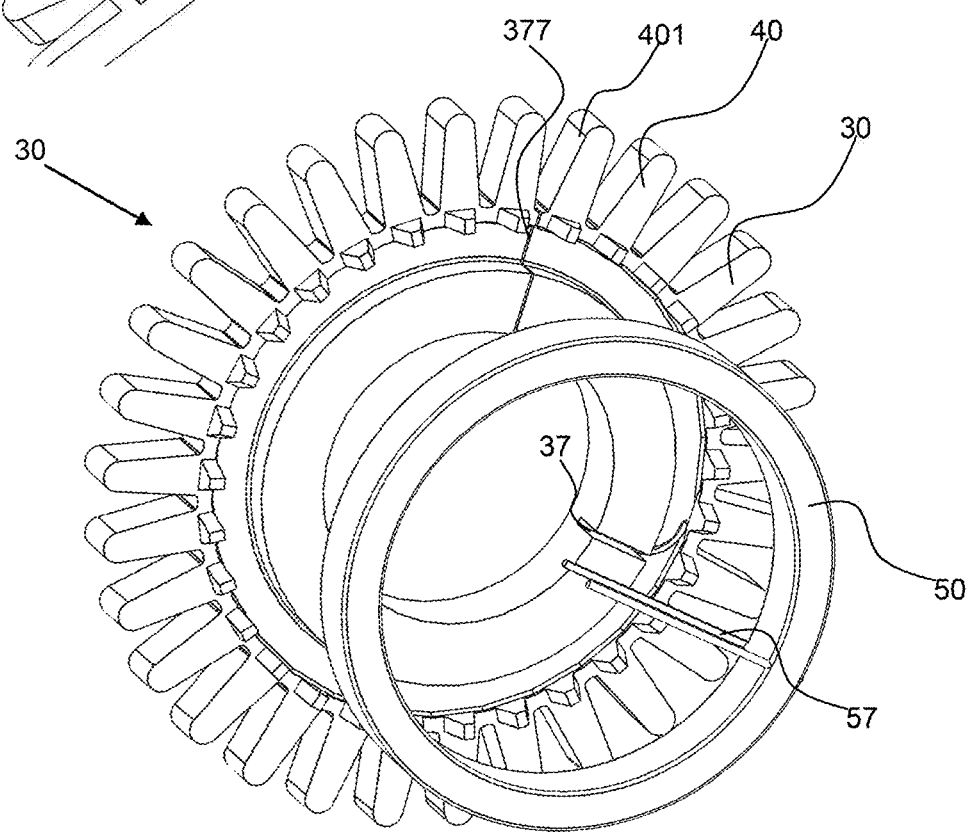
FIG. 36 shows an exemplary shaped armature ring of FIG. 35 with a current cut and also showing a coil configured for insertion into the coil slot with the for coil return wire pressed extending through the wire slot, thereby eliminating need for alpha wound coil windings.
Figure 37:
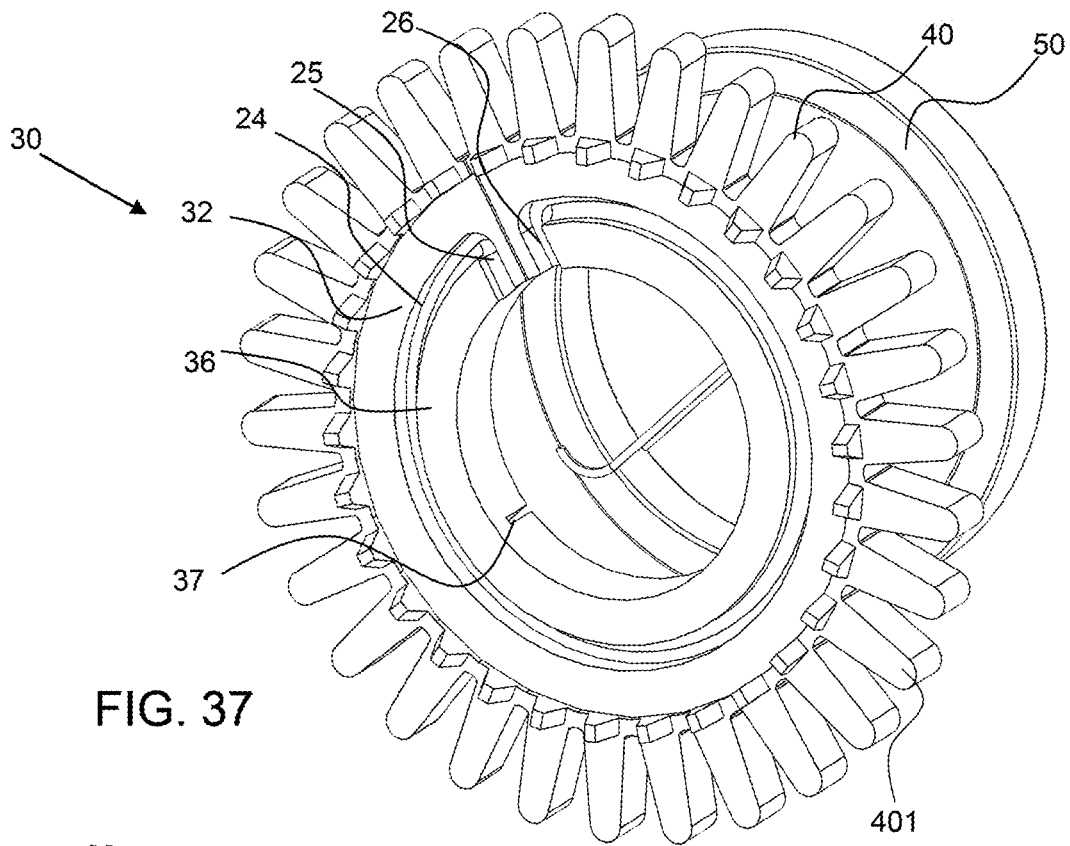
FIG. 37 shows a back side view of the armature ring of FIG. 38, having a cooling channel 24 formed in armature ring for the introduction and flow of a cooling through the cooling inlet and removal of the cooling fluid through a cooling outlet.
Figure 38:
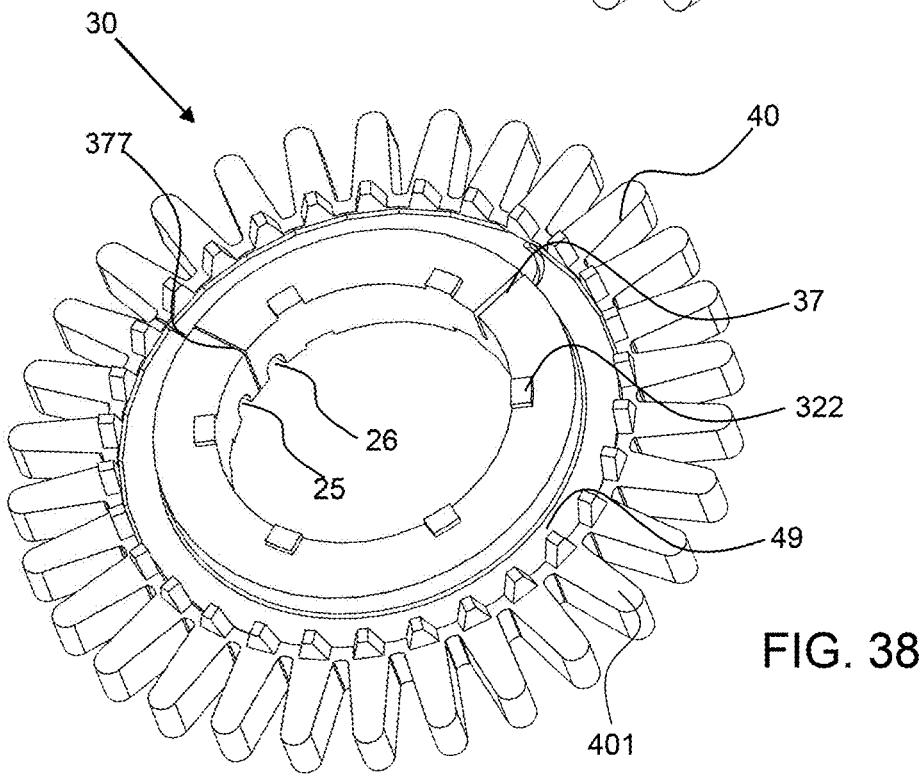
FIG. 38 shows a perspective view of the armature ring of FIG. 37 with armature locating features for locating armatures.
Figure 39:
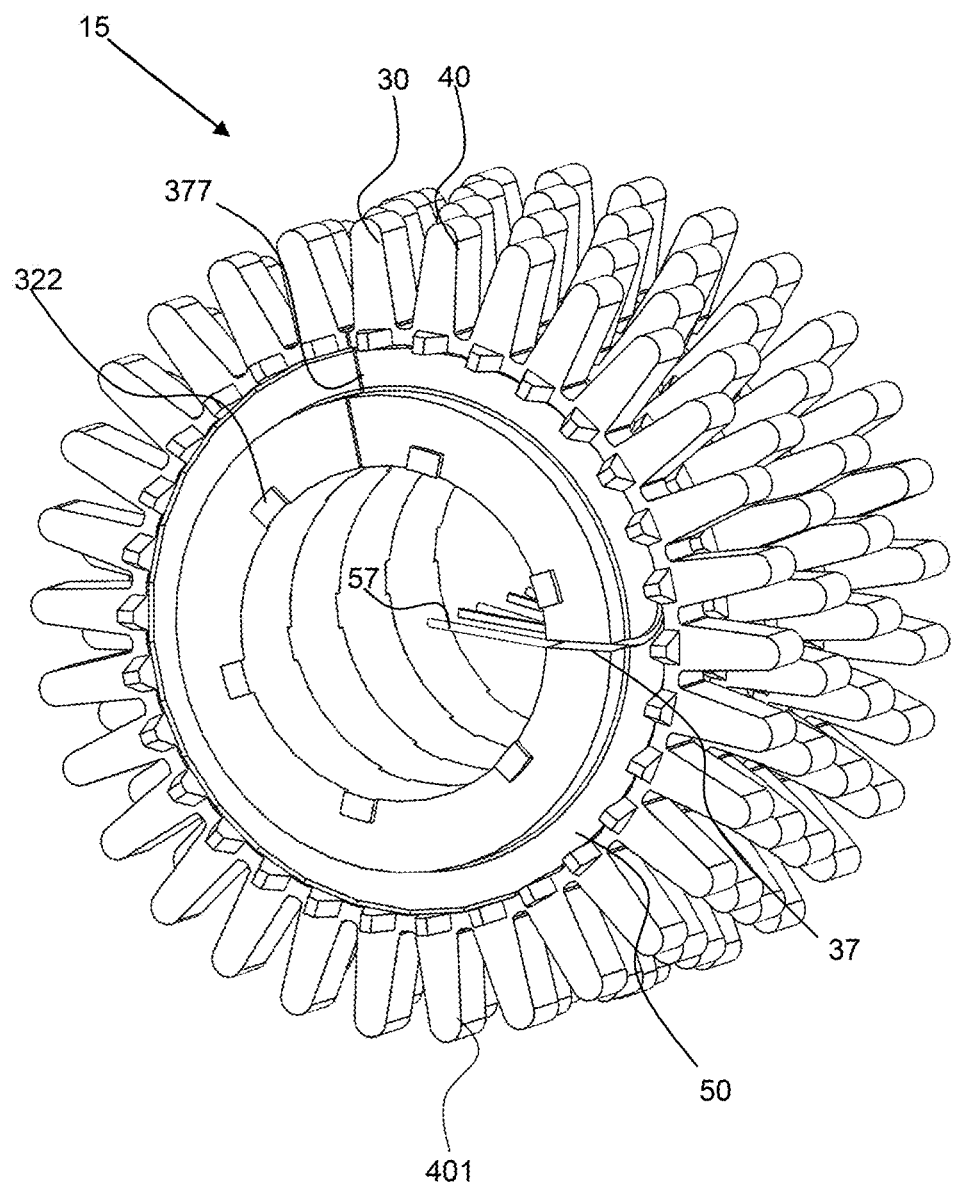
FIG. 39 shows a perspective view of the armature ring of FIG. 38 stacked in a three-phase electric machine arrangement, including coils with coil wires extending to the inside through wire slots in the armature ring.

Referring now to FIGS. 35 to 39, an exemplary shaped armature ring 30, as shown in FIG. 25, is configured with a coil slot 49 for receiving a coil 50, as shown in FIG. 36. The armature ring is configured with coil wire slots 37 to receive the coil wires 57 from the coil slot 49 to the inside of the armature ring. The armature ring also has a current slot 377 to prevent current flow circumferentially around the armature ring 30. As shown in FIG. 37 the armature ring has a cooling channel 24 that extends circumferentially around the armature ring and has a cooling inlet 25 and cooling outlet 26 for the flow of a fluid, such as chilled air, or more preferably a liquid. The armature ring shown in FIG. 38 has armature connector ring locating feature 322 for locating the armature rings in a circumferentially aligned orientation as shown in FIG. 39, with the axially adjacent armature teeth 40 being offset circumferentially. FIG. 39 shows the assembled three-phase electrical machine 15 without the magnet rings. The armature rings shown in FIGS. 35 to 39 are monolithic armature rings that may be made from soft metal composite (SMC). As shown in FIG. 39, the two axially centered monolith shaped armature rings have shared armature teeth, or teeth that collect magnetic flux from opposing axial sides of the tooth, or from two separate magnetic rings or phases of the electric machine. Put another way, a shared armature tooth will be magnetically coupled with two separate toroidal returns.

Figures 40, 41:
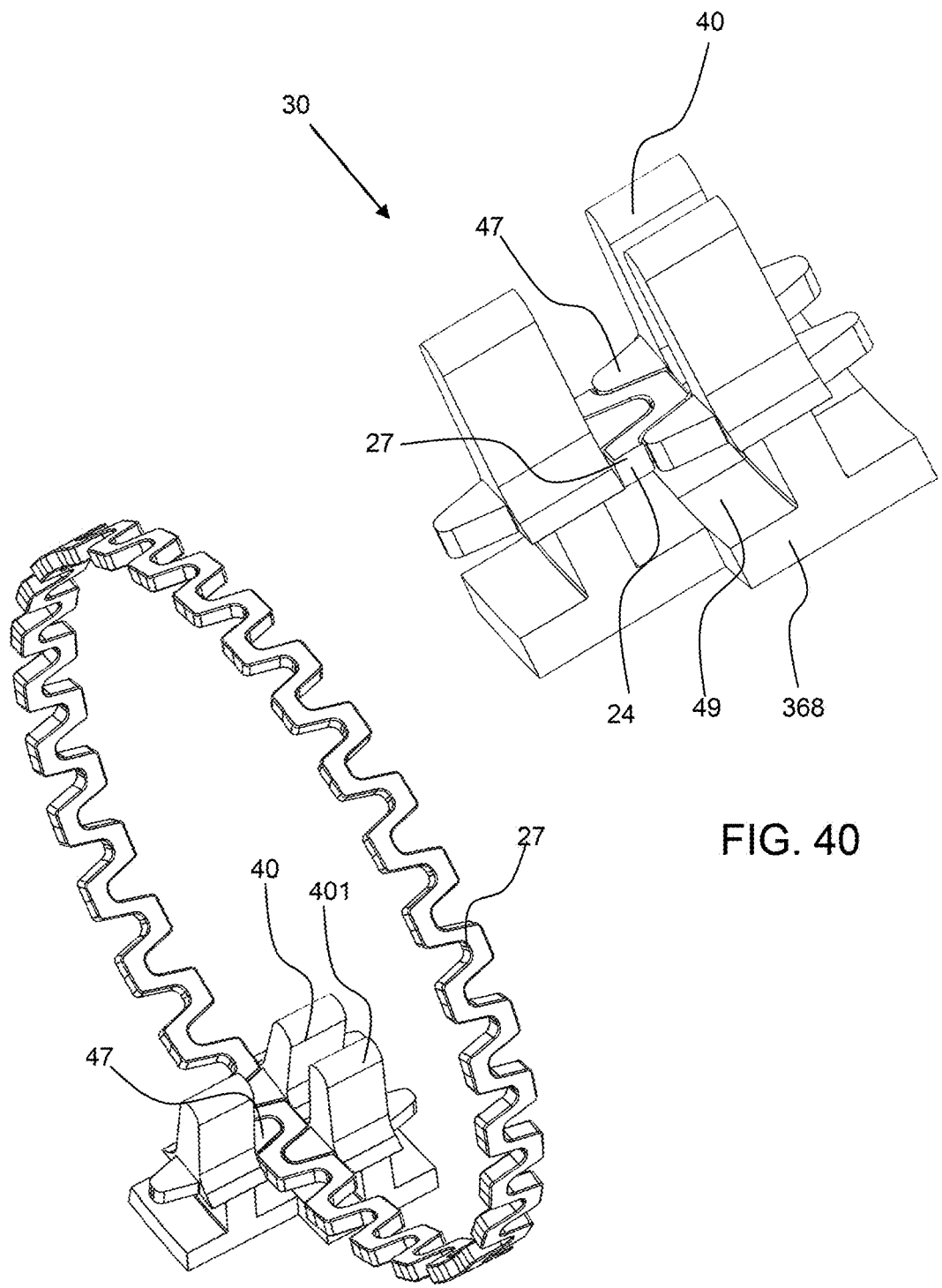
FIG. 40 shows a cross-sectional perspective view of exemplary armature teeth configured where the flux return portion is on the outer diameter of the electric machine and the coil slots are located around the outer diameter of the magnet rings and with a cooling conduit formed by a separate part and configured in the cooling channel between radial gap extensions that allows for fluid to flow for cooling armature and coil windings.
FIG. 41 shows a perspective view of the armature teeth shown in FIG. 40 with the cooling conduit configured in the cooling channel for cooling the armatures and coil for high power density electric machines.
Figure 42:
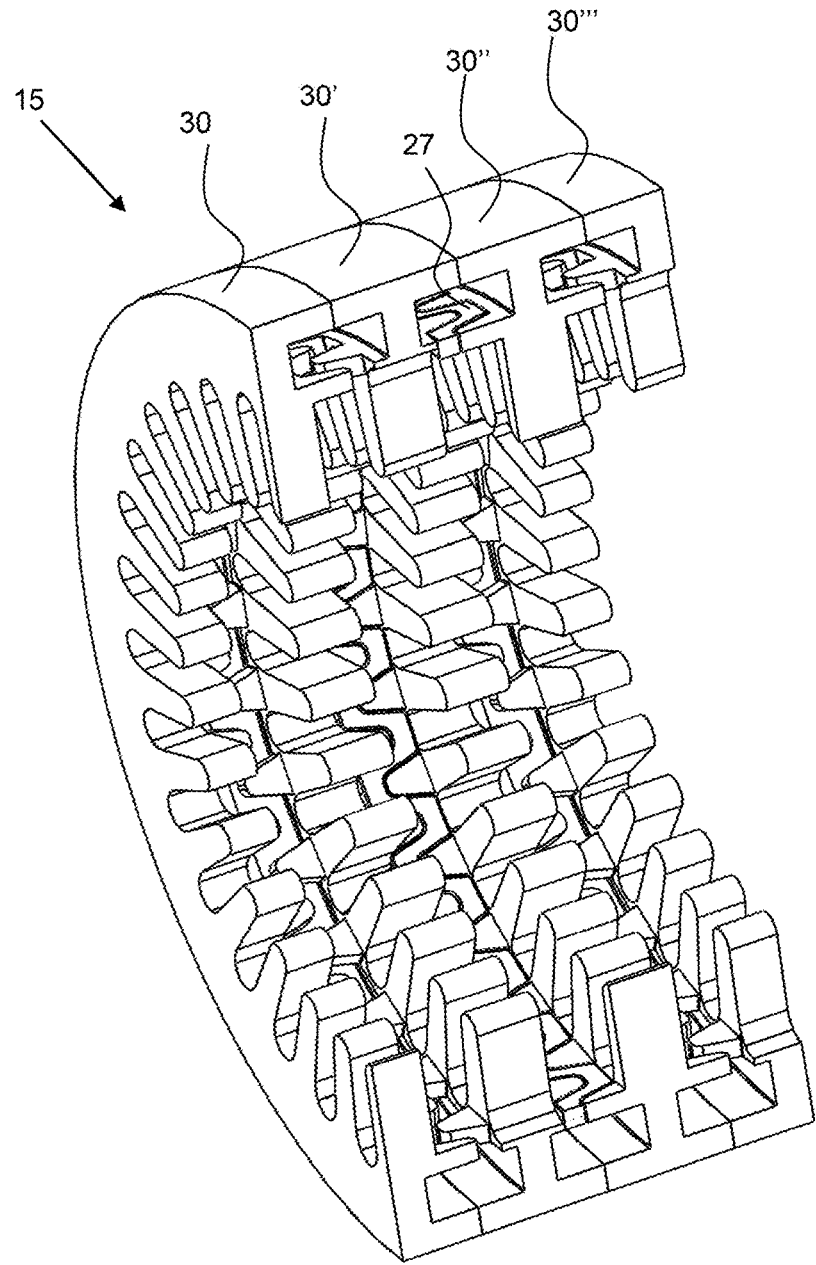
FIG. 42 shows a perspective view of armature rings, similar to those shown in FIG. 40 with armature teeth formed from monolith parts and a cooling conduit configured between the radial gap extensions of the center phase of the electric machine.

Referring now to FIGS. 40, 4.1 and 42, a cooling conduit 24 is configured as a serpentine ring that is configured to fit between the poles, or the radial gap extensions 47 of opposing armature teeth 40. The cooling conduit may be made out of a non-electrically conductive material, such as a plastic. In this configuration, the magnet ring will be the rotating member of the electric machine to enable fixed inlets and outlets to the cooling conduit for a flow of cooling fluid therethrough. As shown in FIG. 42, the three-phase electric machine 15 is formed from armature rings that are monolith parts. For ease of understand the drawings, the cooling conduit 27 is shown configured between the radial gap extensions of the center phase of the electric machine only. A cooling conduit may be configured in one or more of the armature rings, or between the armature rings as shown.

Figure 43:
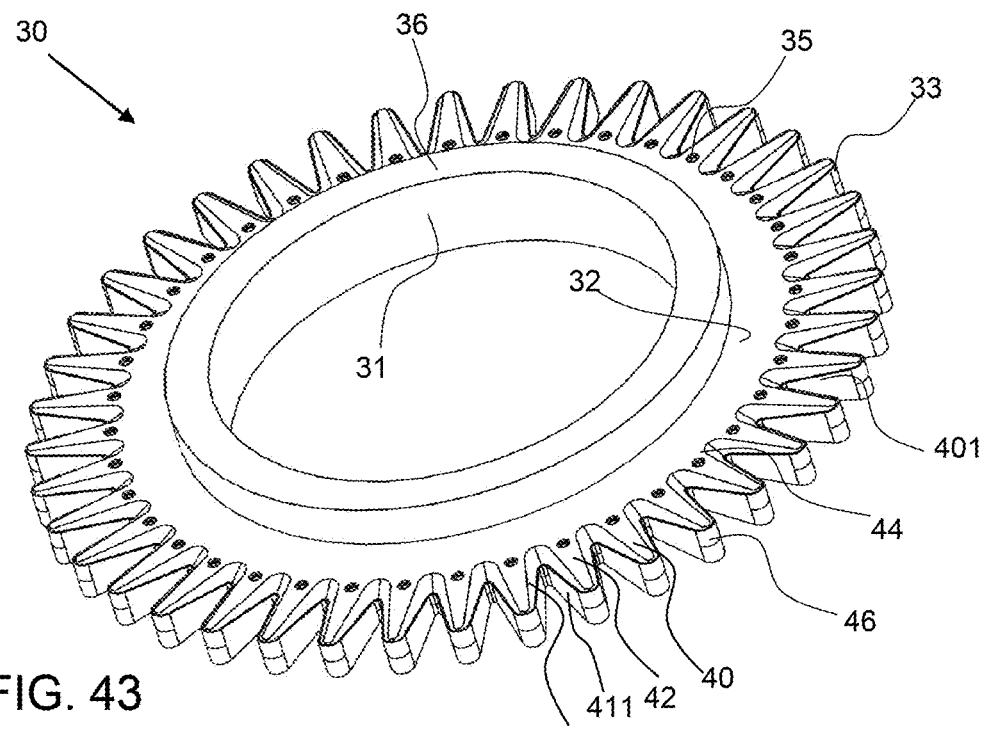
FIG. 43 shows a perspective view of an exemplary monolithic armature ring having tapered armature teeth extending from an armature connector ring.
Figure 44:
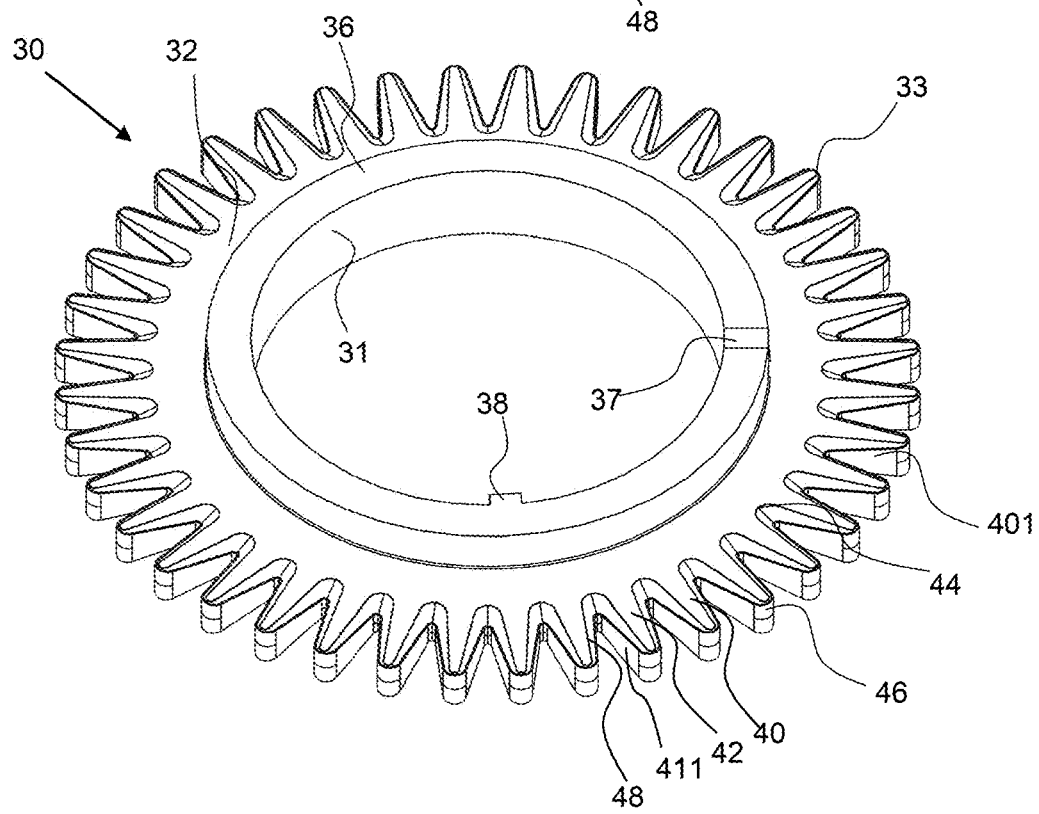
FIG. 44 shows a perspective view of an exemplary monolithic armature ring having tapered armature teeth extending from an armature connector ring, a wire slot extending through a toroidal return and a torque key extending radially inward from the armature connector ring.
Figure 45:
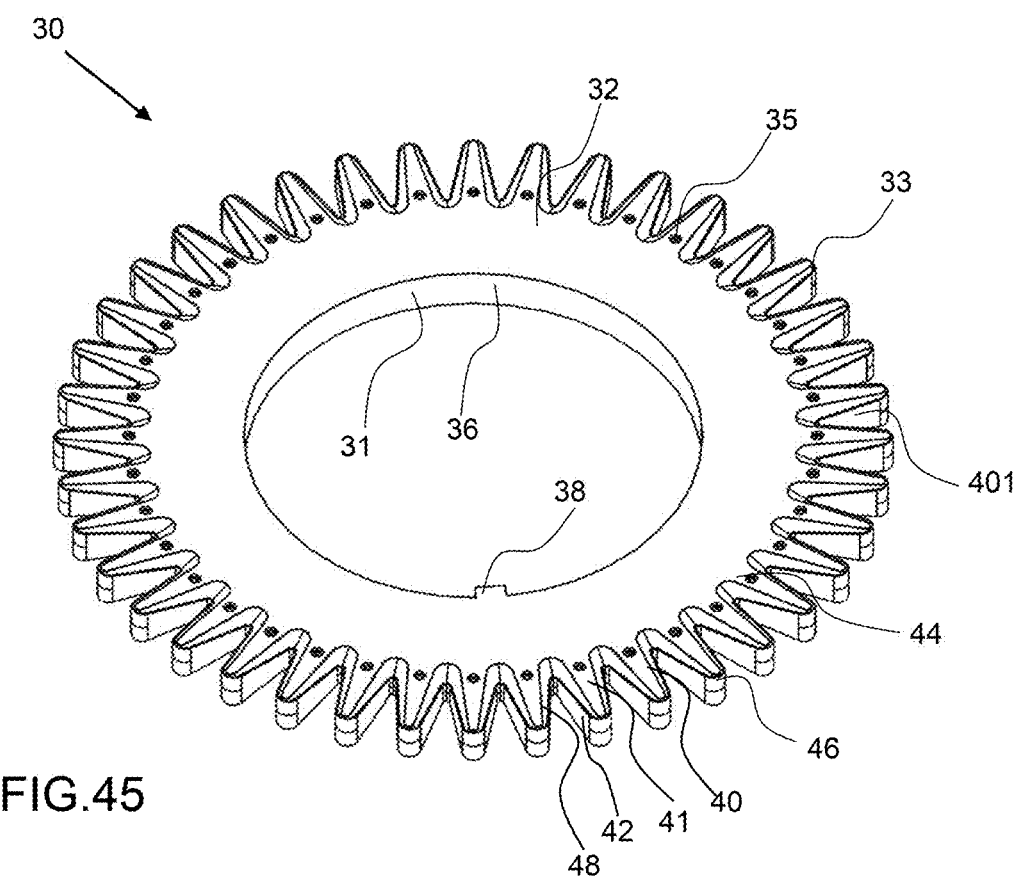
FIG. 45 shows a perspective view of an exemplary monolithic armature ring having tapered armature teeth extending from an armature connector ring and a torque key extending from an inside surface of the armature ring.

Referring now to FIGS. 43 to 45, an exemplary monolithic armature ring 30 comprises an armature connector ring 32 and a plurality or armature teeth 40 that extend radially outward from the armature connector ring. The monolithic armature ring is made of an integral one-piece component, such as being formed from SMC. The armature teeth extend from a connected end 44 to an extended end 46 to produce an armature tooth tip 401, or portion of the armature tooth that extends from the armature connector ring 32. The armature teeth have axial surface 42 that may extend along an axial airgap. The armature tooth tip tapers to an extended end, wherein the connected end of the tip, connected to the armature connector ring 32, is wider circumferentially than the extended end. The distance between circumferential surfaces 411 of the adjacent teeth increases toward the extended ends. The armature teeth also have a tapered surface 48 that tapers up to the axial surface 42, thereby providing increasing area for magnetic flux conduction from the axial airgap surface and increased part strength, as well as increased permeability. The magnetic losses go up as a square of the flux density, therefore increasing the cross-section area for magnetic flux by incorporating the tapered surface 48 and the tapered tooth reduces losses. The tapering armature tooth tip, with a wider connection to the armature connector ring than the extended end, increases strength of the tooth and allows weaker materials to be used to form the tooth and the armature ring which may provide better performance and particularly lower core losses.

The armature teeth also have a circumferential surface 411 extending between the armature teeth. Note too that the armature tooth tips taper from a connected end to the extended end, or in the armature tooth tip portion 401, again, this provides increasing cross-sectional area for magnetic flux to reduce losses, and improved part strength. The armature ring has an inside surface 31 and an outside surface 33. An integral toroidal return 36 is configured along the inside surface 31 and extends axially out from the armature connector ring 32 to enable magnetic flux to be transferred around a magnetic ring.

The exemplary armature ring comprises anti-cogging features 35 configured along the axial surface 42, of the armature tooth tips to reduce cogging. Note that the anti-codding features are located proximal to the connected end of the armature tooth tips. Anti-cogging features are used to shape a cogging and voltage waveform. The anti-cogging feature may be a depression in this radial surface which may be conducive for forming through compression of soft metal composite, or compression of powdered metal, for example. The anti-cogging feature may be on one or both sides of the armature ring and may be on one or more of the armature teeth. Circular feature are shown for simplicity, but a myriad of shaped surfaces are practical As shown in FIGS. 44 and 45, a torque key 38 is configured on an inside surface 31 of the armature ring 30. The torque key is a protrusion from the inside surface that enables electric machine to be coupled with a shaft having a keyway. The key may also be used to align armature to each other. Note that the armature key may be configured on an outside surface when the armature teeth extend radially inward. Also, as shown in FIG. 44, is a wire slot that extends radially through a portion of the armature ring. FIG. 45 shows an end armature ring that does not require a toroidal return.

Figure 46:
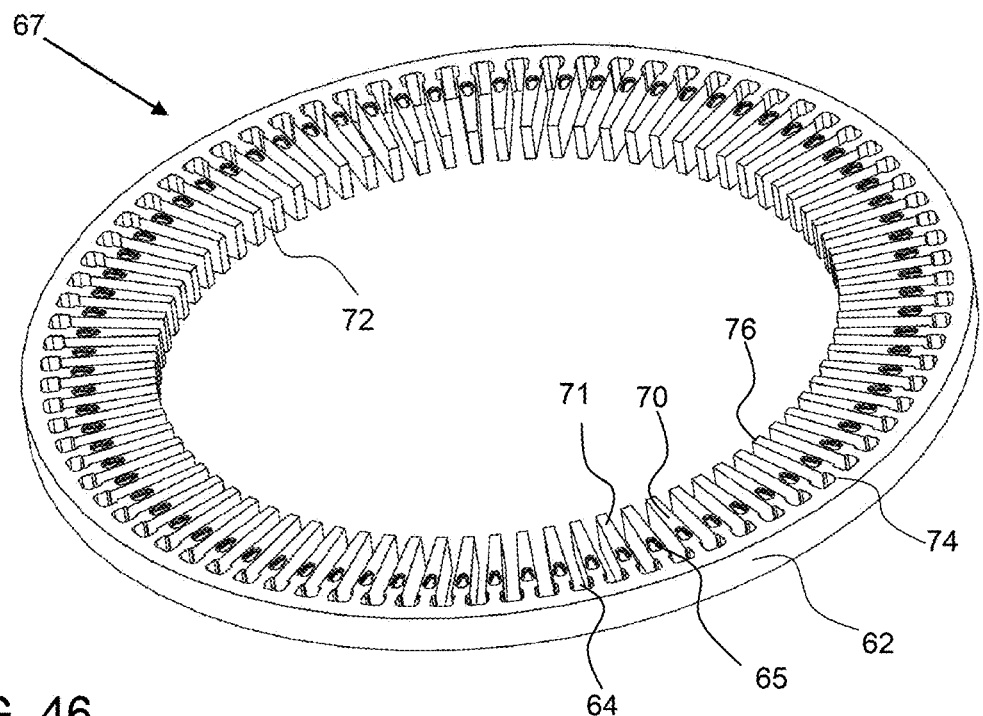
FIG. 46 shows a perspective view of an exemplary monolithic concentrator ring having tapered concentrator teeth extending from the concentrator connector ring.
Figure 47:
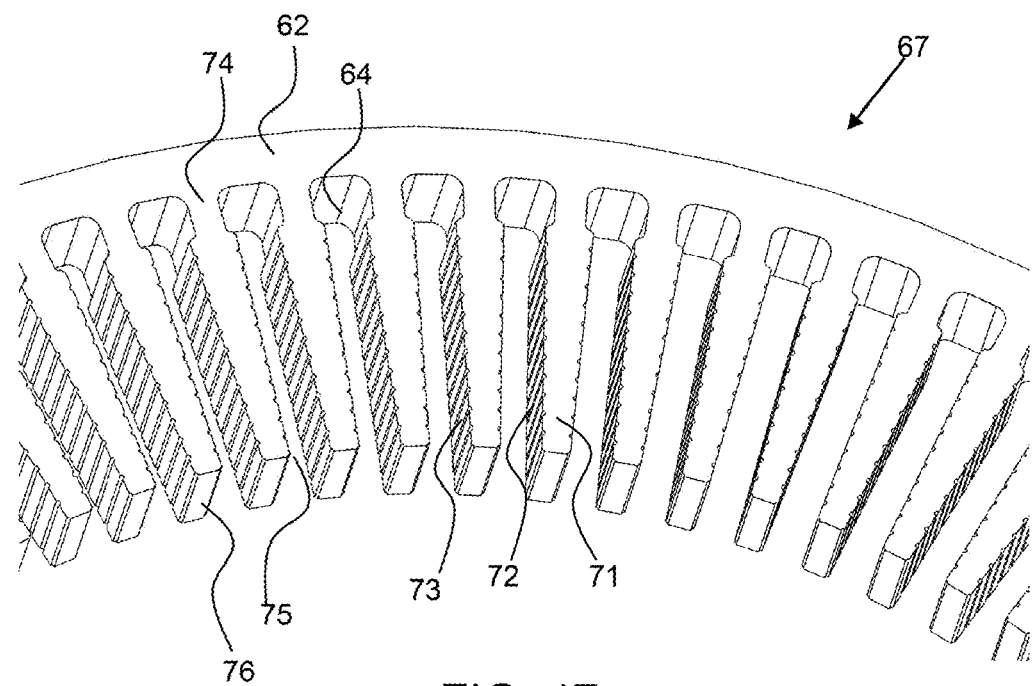
FIG. 47 shows an enlarged perspective view of the exemplary monolithic concentrator ring shown in FIG. 46 having magnet ring retainer receivers along the connected ends of the concentrator teeth an axial profile features in the concentrator teeth.
Figure 48:
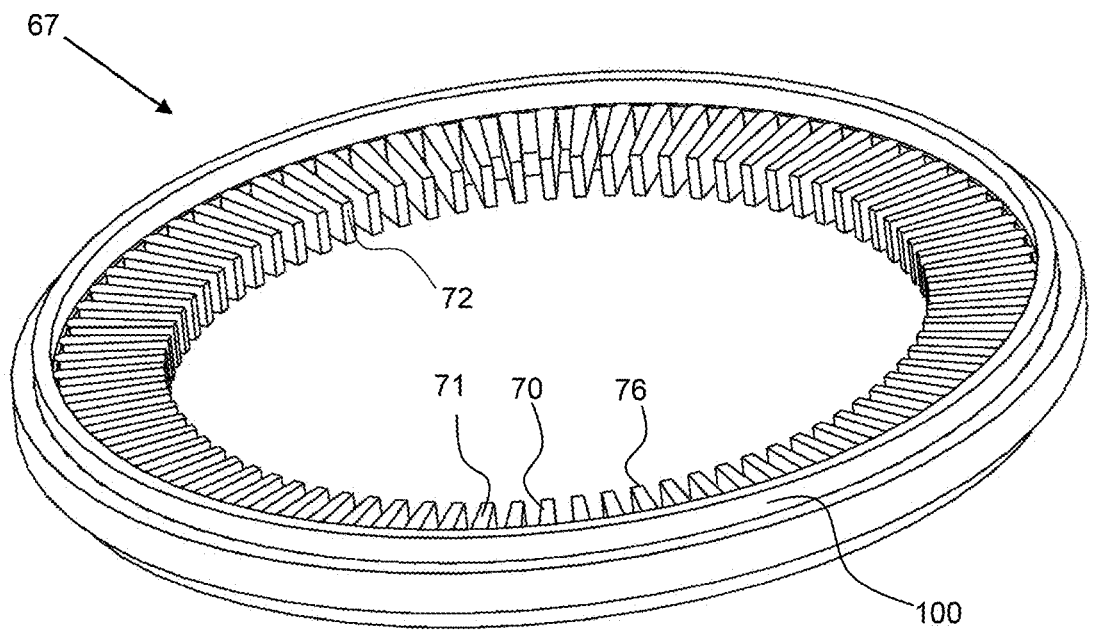
FIG. 48 shows a perspective view of the exemplary monolithic concentrator ring shown in FIG. 46 with a magnet ring retainer coupled to the concentrator ring.
Figure 49:
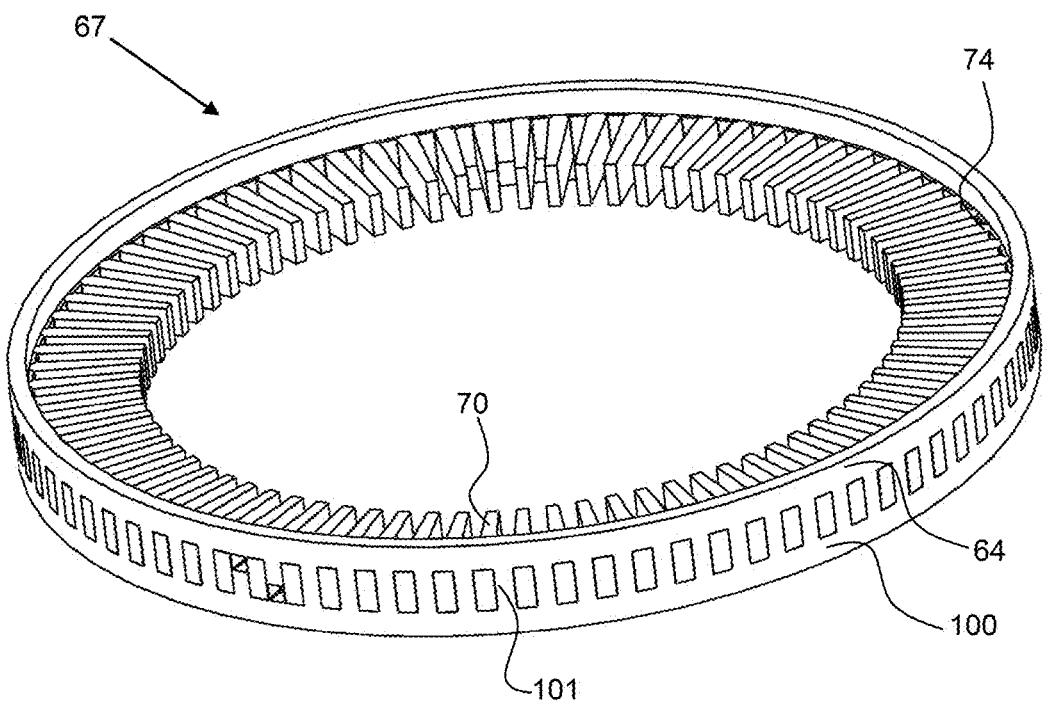
FIG. 49 shows a perspective view of the exemplary monolithic concentrator ring and ring lock shown in FIG. 46 with a magnet ring retainer and concentrator ring machined off to show magnet ring retainer extensions configured between the concentrator teeth and in the ring lock receivers.

Referring now to FIGS. 46 and 47, and exemplary concentrator ring 67 has a plurality of concentrator teeth 70 extending radially inward from the concentrator connector ring 62. The concentrator ring is a monolithic part that may be made from soft metal composite (SMC) or compression forming of powdered metal. The concentrator teeth have gaps 75 between them for receiving magnets to form poles for the electric machine. The concentrator teeth extend from a connected end 74 to an extended end 76 and have an axial surface 71 and a radial surface 76. The axial surface extends along an axial airgap with the armature teeth in an exemplary embodiment. An axial profile feature 73, or an irregular surface such as a plurality of grooves, extends along the axial surface 72 to enable an adhesive to flow along the surface to retain a magnet thereto. Axial profile features may also be used to shape cogging and voltage waveforms. A magnet ring retainer receiver 64 is configured proximal to the connected end 74 of the concentrator teeth and is configured to receive magnet ring retainer extensions as shown in FIGS. 48 and 49. The magnet ring retainer receiver is larger circumferentially than the gap between the teeth. The concentrator connector ring extends around the outer surface of the concentrator ring 67 and may be partly or completely machined off after attachment of the magnet ring retainer, as shown in FIG. 49. The magnet ring retainer receiver 64 causes the concentrator teeth to narrow proximal to the connection with the concentrator connector ring 62 which reduces the amount of flux going into the concentrator connector ring that is not useful. This neck down portion produces a dove-tail to hold the concentrators into the non-magnetic spacer ring which support and position the magnet ring. An anti-cogging feature 65 is shown in FIG. 46 configured on the axial surface of the concentrator teeth and may be a depression or dimple or any other shape deviating from flat in the axial surface to reduce cogging. The anti-cogging feature is configured on the axial surface of the concentrator tooth 70.

As shown in FIGS. 48 and 49, a magnet ring retainer 100 is coupled to the concentrator ring 67 to provide structural support and locate the magnet rings. The magnet ring retainer may be partly or completely machined off to expose the magnet ring retainer extensions 101 configured between the concentrator teeth 70. Machining off the magnet ring retainer will reduce the size of the electric machine and increase torque production because flux leakage is reduced. A magnet ring retainer may be a non-magnetic material.

Figure 50:
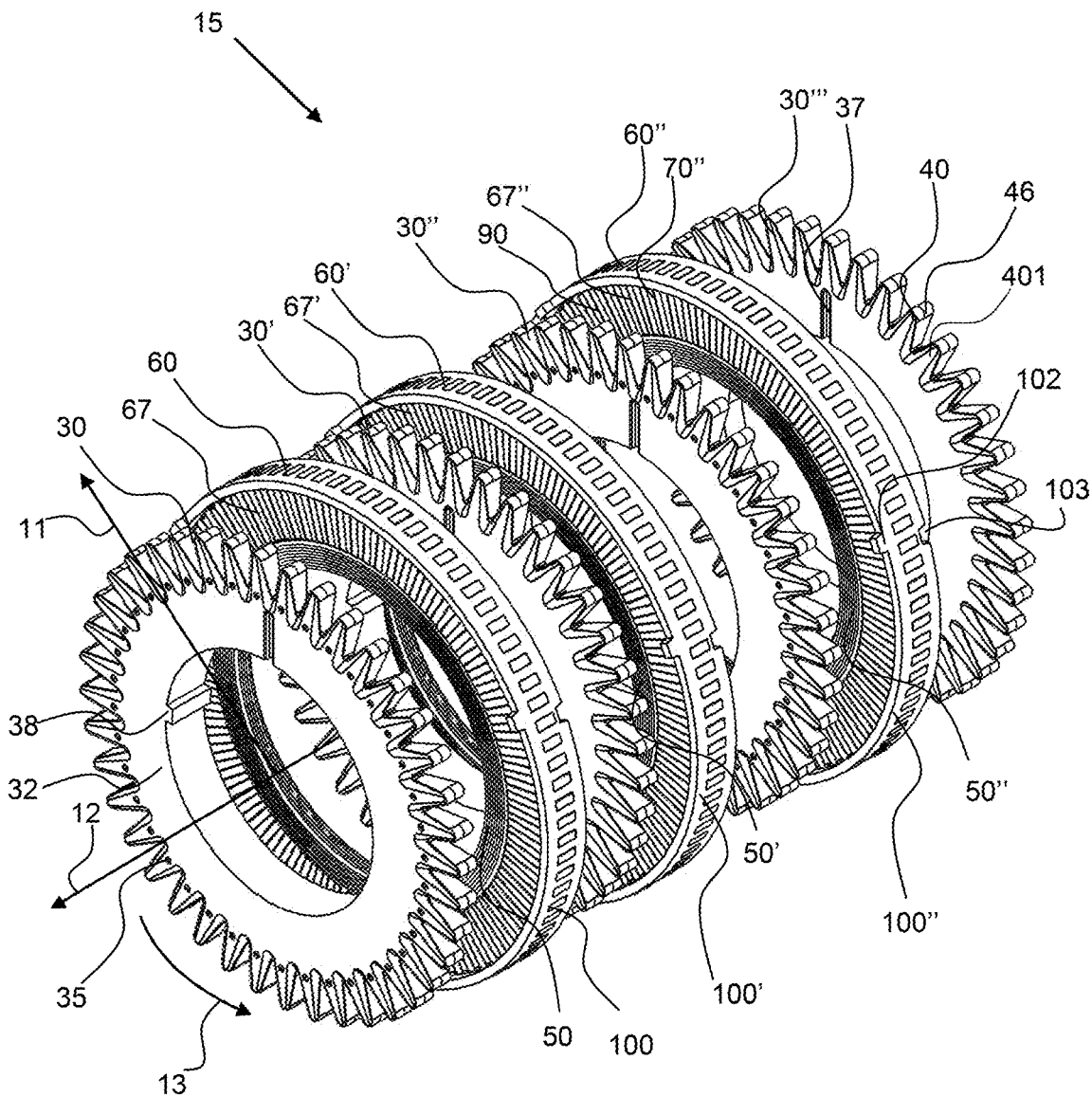
FIG. 50 shows an exploded view of a three-phase electric machine formed from monolithic armature rings and monolith concentrator rings with magnets configured between the concentrator teeth and wherein the electric machine has only axial airgaps.

As shown in FIG. 50, an exemplary three-phase electric machine 15 has four armature rings 30-30''' and three concentrator rings 67-67''. The magnet rings have an alignment key 102 and an alignment keyway 103 to align the components together. The magnet rings may be an integral part of the concentrator ring or a part of the magnet ring retainer. The axial airgap is formed between the concentrator teeth 70 and the armature teeth 40. Magnetic poles 90 are configured between the magnets. The torque key 38 extends radially inward from the armature connector ring. The armature teeth tips 401 extend radially outward and taper in circumferential width from a connect end with the armature connector ring to the extended end 46. The axial airgap is formed between the armature teeth tips and the magnet ring 60.

Figure 51:
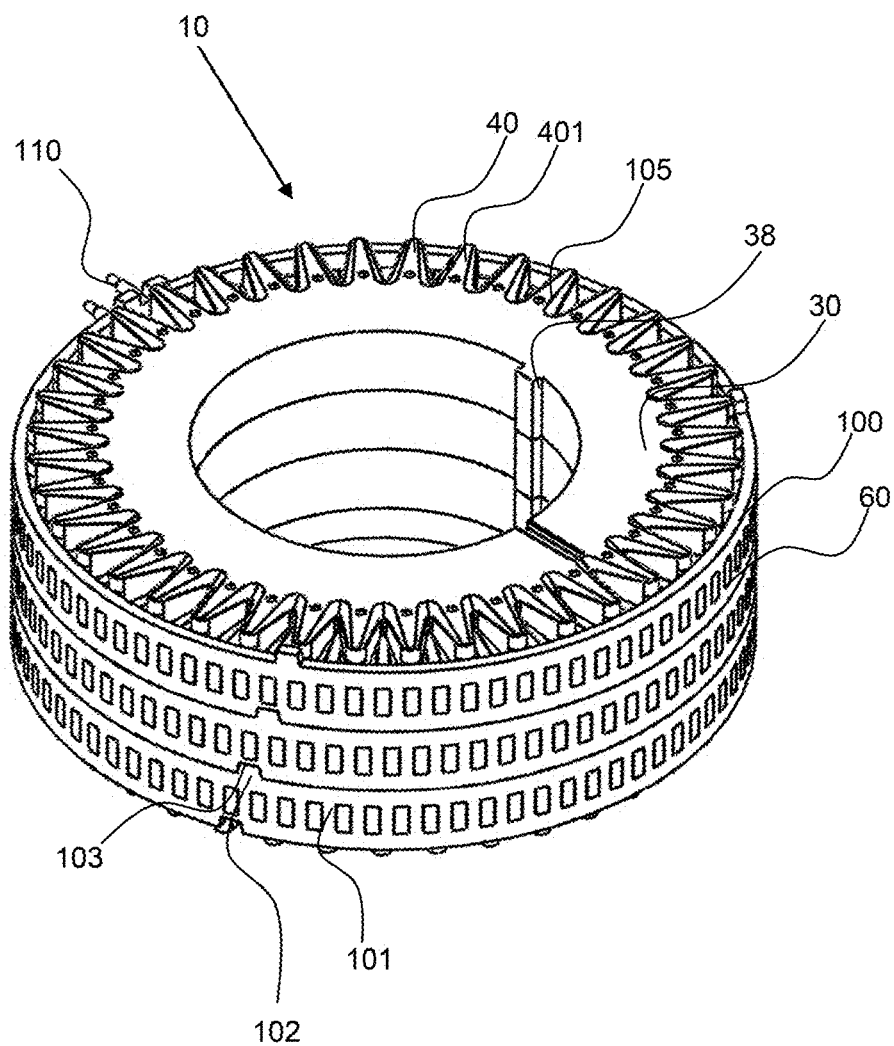
FIG. 51 shows a perspective view of the three-phase electric machine shown in FIG. 50 assembled.

FIG. 51 shows the exemplary electric machine 10 shown in FIG. 50, assembled with the torque keys 38 aligned and the magnet ring's alignment keys 102 configured in the magnet ring alignment keyways 103. The torque keys are protrusions from the armature ring that may be molded into the monolithic armature ring. Wire attachments 110 extend out from the outer diameter of the magnet ring retainer 100 in this inner rotating electric machine. This configuration only works where the coil is stationary with the armature.

As shown in FIGS. 50 and 51, the two axially centered armature rings 30', 30", are shared armature rings have armature teeth that are shared armature teeth and collect magnetic flux from two axially opposing magnet rings. These monolithic shared armature rings reduce the number of components and enable a more compact electric machine. The shared armature teeth are an integral part of the monolithic armature rings.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A multi phase transverse flux electric machine comprising:
   a) a first magnet ring comprising a plurality of magnets and a plurality of concentrators;
   b) a second magnet ring comprising a plurality of magnets and a plurality of concentrators;
   c) a single set of shared armature teeth extending from a second armature connector ring and configured between said first magnet ring and said second magnet rings, said shared armature teeth formed of shaped soft metal composite (SMC);
   wherein magnetic flux from the first magnet ring and the second magnet ring flow into said armature teeth of the second armature connector ring; and
   d) a first armature connector ring axially displaced on a first side of the first magnet ring, and having armature teeth formed of shaped soft metal composite (SMC);
   wherein said second armature connector ring is configured between the first and second magnet rings;
   wherein the armature teeth of each of the first and second armature connector rings extend from the respective armature connector ring;
   wherein the armature teeth of each of the first and second armature connector rings extend radially from the respective armature connector ring to a tooth tip;
   e) a coil between the first armature connector ring and the second armature connector ring;
   wherein the armature teeth of the second connector ring have opposing axial airgap surfaces forming an airgap with the first magnet ring and the second magnet ring;
   wherein the armature teeth of each of the first and second armature connector rings are continuously tapered along the axial air gap surfaces from the armature connector ring to the tooth tip;
   wherein the magnetic flux flows from the first magnet ring into the armature teeth of the second armature connector, then radially to the second armature connector ring, then axially around said central coil, then back to said first magnet ring to produce transverse flux.

2. The multi phase transverse flux electric machine of claim 1 wherein the first and second armature connector rings and the respective armature teeth are each a monolithic armature ring.

3. The multi phase transverse flux electric machine of claim 2, wherein the armature teeth of each of the first and second armature connector rings have a cross-sectional area that increases in a portion of said armature teeth where the flux changes direction from radial to axial.

4. The multi phase transverse flux electric machine of claim 1, wherein the armature teeth of each of the first and second armature connector rings have a radial gap extension forming a radial airgap with the first magnet ring.

5. The multi phase transverse flux electric machine of claim 4, wherein the radial gap extension is tapered from the armature tooth.

6. The multi phase transverse flux electric machine of claim 4, wherein the armature teeth of the second armature connector ring have an axial airgap surface forming an axial airgap with the first magnet ring and the second magnet ring, wherein the electric machine has both axial airgaps and radial airgaps.

7. The multi phase transverse flux electric machine of claim 1, wherein the each of the armature teeth of the first and second armature connector rings has a flux return extensions that forms said armature connector ring.

8. The multi phase transverse flux electric machine of claim 7, wherein the first and second magnetic rings are configured radially outward from each of the first and second the armature connector rings, and wherein the first magnetic ring comprises magnetic poles configured between armature teeth of the first and second the armature connector thereby forming axial airgaps and radial airgaps.

9. The multi phase transverse flux electric machine of claim 1, wherein the armature teeth of the first and second armature connector rings further comprise an anti-cogging feature configured on an airgap surface of the armature teeth, wherein the anti-cogging feature is a depression in the airgap surface of the armature teeth.

10. The multi phase transverse flux electric machine claim 1, further comprising a cooling conduit that is configured between the first and second armature connector rings, and wherein the cooling conduit has a cooling fluid inlet for receiving a flow of cooling fluid and a cooling fluid outlet.

11. The multi phase transverse flux electric machine of claim 1, wherein both the first and the second armature connector rings each comprise a coil slot extending circumferentially around the armature connector ring and configured to receive said coil.

12. The multi phase transverse flux electric machine of claim 11, wherein the first and second armature connector rings and the respective armature teeth are each a monolithic armature ring.

13. The multi phase transverse flux electric machine of claim 1, wherein the each of the first and second armature connector rings further comprises a current slot that extends radially through at least a portion of the armature connector ring to prevent circumferential current flow through said armature connector ring.

14. The multi phase transverse flux electric machine of claim 1, wherein each of the first and second the armature connector rings comprises a cooling conduit extending circumferentially around the armature connector ring and configured to receive a flow of cooling fluid.

15. The multi phase transverse flux electric machine of claim 1, wherein each of the first and second the armature connector rings comprise a toroidal return extending circumferentially around the armature connector ring and configured to conduct magnetic flux around said coil.

16. The multi phase transverse flux electric machine of claim 15, wherein each of the first and second the armature connector rings, the respective armature teeth, and the respective toroidal return are a monolithic armature ring.

17. The multi phase transverse flux electric machine of claim 1, wherein the first and second magnetic rings are configured radially inward from the armature connector ring and wherein the first and second magnet rings each comprise magnetic poles configured between armature teeth thereby forming axial airgaps and radial airgaps.

18. The multi phase transverse flux electric machine of claim 1,
wherein the first magnet ring and second magnet ring each comprise a repeating arrangement of the plurality of magnets and the plurality of concentrators comprising:
a high coercivity magnet;
a first concentrator;
a low coercivity magnet; and
a second concentrator;
wherein the repeating arrangement of magnets and concentrators has said first concentrator circumferentially arranged following the high coercivity magnet, followed circumferentially by the low coercivity magnet and the second concentrator circumferentially arranged following the low coercivity magnet; and
wherein a field strength of the low coercivity magnets is changed by a pulse of current in the coil.

19. The multi phase transverse flux electric machine of claim 18, wherein a field strength of the low coercivity magnets is changed by at least 20% by the pulse of current.

20. The multi phase transverse flux electric machine of claim 18, wherein a field strength of the low coercivity magnets is adjusted to substantially zero by the pulse of current.

21. The multi phase transverse flux electric machine of claim 18, wherein a field strength of the low coercivity magnets is reversed by the pulse of current.

22. The multi phase transverse flux electric machine of claim 18, further comprising a controller that interfaces with an RPM sensor and torque requirement input and wherein when both the RPM level is above a threshold level and the torque requirement input is below a threshold level the controller initiates a pulse of to reduce the field strength of the low coercivity magnet.

23. The multi phase transverse flux electric machine of claim 18, further comprising a controller that interfaces with an RPM sensor and torque requirement input and wherein when both the RPM level is above a threshold level and the torque requirement input is below a threshold level the controller initiates a pulse of to reverse the field strength of the low coercivity magnet.

24. A multi phase transverse flux electric machine comprising:
a) a first magnet ring comprising a plurality of magnets and a plurality of concentrators;
b) a second magnet ring comprising a plurality of magnets and a plurality of concentrators;
c) a single set of shared armature teeth extending from a second armature connector ring and configured between said first magnet ring and said second magnet rings, said shared armature teeth formed of shaped soft metal composite (SMC);
wherein magnetic flux from the first magnet ring and the second magnet ring flow into said armature teeth of the second armature connector ring; and
d) a first armature connector ring axially displaced on a first side of the first magnet ring, and having armature teeth formed of shaped soft metal composite (SMC);
wherein said second armature connector ring is configured between the first and second magnet rings;
wherein the armature teeth of each of the first and second armature connector rings extend from the respective armature connector ring;
e) a central coil configured around the second connector ring;
wherein the armature teeth of each of the first and second armature connector rings extend radially from the respective armature connector ring to a tooth tip;
wherein the magnetic flux flows from the first magnet ring into the armature teeth of the second armature connector, then radially to the second armature connector ring, then axially around said central coil, then back to said first magnet ring to produce transverse flux;
wherein each of the armature teeth of the second armature connector ring has a first radial gap extension forming a radial airgap with the first magnet ring and a second radial airgap extension forming a radial airgap with the second magnet ring.

25. The multi phase transverse flux electric machine of claim 24, wherein both the first radial gap extension and second radial gap extension are tapered from the armature tooth.

26. The multi phase transverse flux electric machine of claim 24, wherein the armature teeth of the second armature connector ring have an axial airgap surface forming an airgap with the first magnet ring and the second magnet ring, wherein the electric machine has both axial airgaps and radial airgaps.

27. The multi phase transverse flux electric machine of claim 26, wherein the armature teeth of the second armature connector ring are tapered to the axial airgap surface.

28. The multi phase transverse flux electric machine of claim 24, wherein each of the first and second armature connector rings and the respective armature teeth are a monolithic armature ring.

29. A multi phase transverse flux electric machine of claim 24, wherein the first magnet ring and second magnet ring each comprise a repeating arrangement of magnets and flux concentrators comprising:
a high coercivity magnet;
a first flux concentrator;
a low coercivity magnet;
a second flux concentrator;
wherein the repeating arrangement of magnets and flux concentrators has said first flux concentrator circumferentially arranged following the high coercivity magnet, followed circumferentially by the low coercivity magnet and a second flux concentrator circumferentially arranged following the low coercivity magnet; and
wherein a field strength of the low coercivity magnets is changed by a pulse of current in the coil.

30. The multi phase transverse flux electric machine of claim 29, wherein a field strength of the low coercivity magnets is changed by at least 20% by the pulse of current.

31. The multi phase transverse flux electric machine of claim 29, wherein a field strength of the low coercivity magnets is adjusted to substantially zero by the pulse of current.

32. The multi phase transverse flux electric machine of claim 29, wherein a field strength of the low coercivity magnets is reversed by the pulse of current.

33. The multi phase transverse flux electric machine of claim 29, further comprising a controller that interfaces with an RPM sensor and torque requirement input and wherein when both the RPM level is above a threshold level and the torque requirement input is below a threshold level the controller initiates a pulse of to reduce the field strength of the low coercivity magnet.

34. The multi phase transverse flux electric machine of claim 29, further comprising a controller that interfaces with an RPM sensor and torque requirement input and wherein when both the RPM level is above a threshold level and the torque requirement input is below a threshold level the controller initiates a pulse of to reverse the field strength of the low coercivity magnet.

35. A multi phase transverse flux electric machine comprising:
a) a first magnet ring comprising a plurality of magnets and a plurality of concentrators;
b) a second magnet ring comprising a plurality of magnets and a plurality of concentrators;
c) a single set of shared armature teeth extending from a second armature connector ring and configured between said first magnet ring and said second magnet rings, said shared armature teeth formed of shaped soft metal composite (SMC);
wherein magnetic flux from the first magnet ring and the second magnet ring flow into said armature teeth of the second armature connector ring; and
d) a first armature connector ring axially displaced on a first side of the first magnet ring, and having armature teeth formed of shaped soft metal composite (SMC);
wherein said second armature connector ring is configured between the first and second magnet rings;
wherein the armature teeth of each of the first and second armature connector rings extend from the respective armature connector ring;
e) a central coil configured around the second armature connector ring;
wherein the armature teeth of each of the first and second armature connector rings extend radially from the respective armature connector ring to a tooth tip;
wherein the magnetic flux flows from the first magnet ring into the armature teeth of the second armature connector, then radially to the second armature connector ring, then axially around said central coil, then back to said first magnet ring to produce transverse flux;
wherein each of the first magnet ring and the second magnet ring comprise:
i) a concentrator connector ring wherein the plurality of concentrators are a plurality of concentrator teeth extending from said concentrator connector ring; and
wherein said plurality of magnets are configured between adjacent concentrator teeth;
wherein the concentrator connector ring and plurality of concentrator teeth is a monolith component formed of shaped soft metal composite;
wherein one of the armature rings and the first and second magnet rings rotates about an axial axis and wherein the armature teeth extend radially with respect to the axial axis; and
wherein an axial airgap is formed between the armature teeth and the concentrator teeth;
whereby magnetic flux moves across the axial airgap.

36. The multi phase transverse flux electric machine of claim 35, wherein the concentrator teeth of each of the first and second magnetic rings further comprise an anti-cogging feature configured on an airgap surface of the concentrator teeth.

37. The multi phase transverse flux electric machine of claim 36, wherein the anti-cogging feature is a depression in the airgap surface of the concentrator teeth.

38. The multi phase transverse flux electric machine of claim 35, wherein the armature teeth of each of the first and second armature connector rings further comprise an anti-cogging feature configured on an airgap surface of the armature teeth.

39. The multi phase transverse flux electric machine of claim 38, wherein the anti-cogging feature is a depression in the airgap surface of the armature teeth.

40. The multi phase transverse flux electric machine of claim 35, wherein the first and second armature connector rings each comprises a toroidal return extending circumferentially around said armature connector ring and configured to flow magnetic flux around said coil from.

\* \* \* \* \*